(12) United States Patent
Stewart

(10) Patent No.: US 11,493,695 B2
(45) Date of Patent: Nov. 8, 2022

(54) SUSTAINED CONTINUITY NON-POWERED OPTOMECHANICAL POSITION SWITCH UTILIZING SELF-TESTING MULTIPLEXED OPTOCONTROLLING TRANSCEIVER IN A FIBER-OPTIC CIRCUIT

(71) Applicant: Thomas C. Stewart, Charleston, WV (US)

(72) Inventor: Thomas C. Stewart, Charleston, WV (US)

( * ) Notice: Subject to any disclaimer, the term of this patent is extended or adjusted under 35 U.S.C. 154(b) by 326 days.

(21) Appl. No.: 16/902,696

(22) Filed: Jun. 16, 2020

(65) Prior Publication Data

US 2020/0408994 A1  Dec. 31, 2020

Related U.S. Application Data

(60) Provisional application No. 62/866,014, filed on Jun. 25, 2019.

(51) Int. Cl.
*G02B 6/35* (2006.01)
*H04B 10/40* (2013.01)
(Continued)

(52) U.S. Cl.
CPC ........... *G02B 6/3514* (2013.01); *H01H 23/12* (2013.01); *H04B 10/40* (2013.01); *H04B 10/807* (2013.01); *H01H 2300/01* (2013.01)

(58) Field of Classification Search
CPC .. G02B 6/3514; G02B 6/4246; G02B 6/3508; H01H 23/12; H01H 2300/01;
(Continued)

(56) References Cited

U.S. PATENT DOCUMENTS

| 4,315,147 A | 2/1982 | Harmer |
| 4,495,421 A | 1/1985 | Endo et al. |

(Continued)

FOREIGN PATENT DOCUMENTS

| CN | 208629770 U | * | 3/2019 |
| GB | 2078943 A | | 1/1982 |

(Continued)

OTHER PUBLICATIONS

International Preliminary Report on Patentability dated Dec. 18, 2021 in related International Application No. PCT/US2020/038040.
(Continued)

*Primary Examiner* — Leslie C Pascal
(74) *Attorney, Agent, or Firm* — Dinsmore & Shohl LLP; Monika L. Jaensson, Esq.

(57) ABSTRACT

A non-powered passive optomechanical position switch and an operational control system for controlling an apparatus using an optical fiber waveguide, the switch including an orientable structure supporting a plurality of reflective surfaces at the terminus of the optical fiber waveguide, wherein at least some of the reflective surfaces each uniquely manipulates one or more properties of light received from the optical fiber waveguide in reflecting light back through the optical fiber waveguide to an optocontrolling transceiver. Orienting the orientable structure relative to the terminus of the optical fiber determines which of the plurality of reflective surfaces is positioned at the terminus of the optical fiber waveguide, and thereby determines what properties of light are manipulated and reflected back to the optocontrolling transceiver, through the optical fiber waveguide thereby controlling an apparatus.

16 Claims, 18 Drawing Sheets

(51) Int. Cl.
*H01H 23/12* (2006.01)
*H04B 10/80* (2013.01)

(58) Field of Classification Search
CPC .... H01H 23/025; H01H 23/145; H04B 10/40; H04B 10/807
See application file for complete search history.

(56) References Cited

U.S. PATENT DOCUMENTS

| | | | |
|---|---|---|---|
| 4,705,348 A | 11/1987 | Matsunaga et al. | |
| 5,046,806 A | 9/1991 | Kidder et al. | |
| 5,101,463 A | 3/1992 | Cubukciyan et al. | |
| 5,133,030 A | 7/1992 | Lee | |
| 5,163,112 A | 11/1992 | Lefevre et al. | |
| 5,216,246 A | 6/1993 | Weidman et al. | |
| 5,408,550 A * | 4/1995 | Lefevre | G02B 6/3532 385/18 |
| 5,548,669 A * | 8/1996 | Anderson | G02B 6/352 385/16 |
| 6,014,478 A * | 1/2000 | Spaeth | G02B 6/351 385/23 |
| 8,331,795 B2 | 12/2012 | Elberbaum | |
| 8,461,514 B1 | 6/2013 | Rickenbach | |
| 8,659,749 B2 * | 2/2014 | Bridges | G01S 17/42 356/5.13 |
| 9,772,394 B2 * | 9/2017 | Nagalla | G01B 11/002 |
| 10,001,367 B2 | 6/2018 | Anderson | |
| 2010/0201893 A1 * | 8/2010 | Pryor | G06F 3/0312 348/837 |
| 2014/0347674 A1 | 11/2014 | Anderson | |

FOREIGN PATENT DOCUMENTS

| | | |
|---|---|---|
| KR | 20100030636 A | 2/2014 |
| WO | 1985005697 A1 | 6/1984 |
| WO | 2008147415 A1 | 12/2008 |

OTHER PUBLICATIONS

Dennis Horwitz "Micronor Invents World's First Absolute Fiber Optic Position Sensor with EMI Immunity, Lightning Resistance and 13-Bit Resolution" May 31, 2011https://www.businesswire.com/news/home/20110531007134/en/Micronor-Invents-Worlds-Absolute-Fiber-Optic-Position.

International Search Report and Written Opinion dated Oct. 6, 2020, pertaining to International Application No. PCT/US2020/038040 filed Jun. 17, 2020 (10 pgs.).

* cited by examiner

FIG.36
FIG. 37
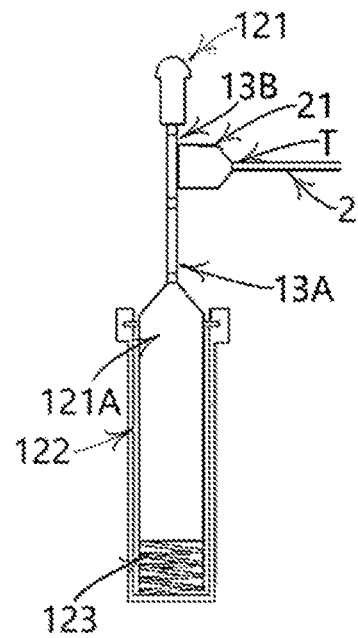
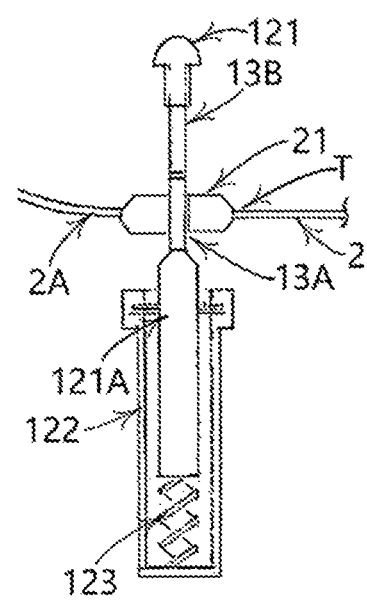
FIG. 38
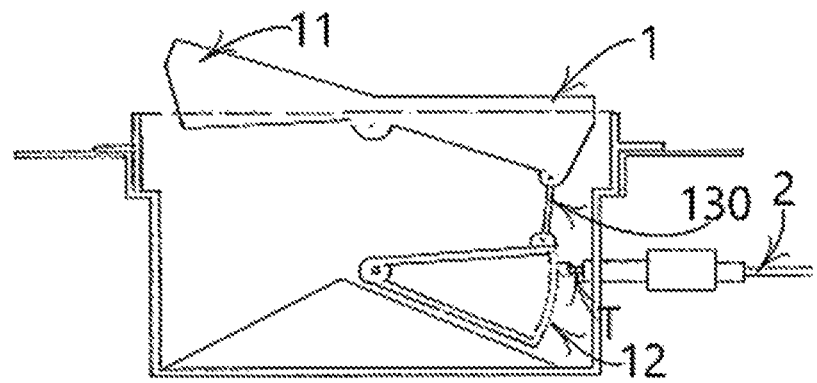

SPST

SPCO/
SPTT, C.O.

SPST

SPCO/
SPTT, C.O.

Potentiometer

SUSTAINED CONTINUITY NON-POWERED OPTOMECHANICAL POSITION SWITCH UTILIZING SELF-TESTING MULTIPLEXED OPTOCONTROLLING TRANSCEIVER IN A FIBER-OPTIC CIRCUIT

Disclosed are devices and systems that selectively use wavelengths and polarity of the visible and infrared portion of the electromagnetic spectrum of light to control the operation of an apparatus. The light is transmitted through an optical fiber waveguide between the controller of the apparatus and a remote non-powered passive optical mechanical (or optomechanical) position switch. The switch is designed and configured to optically manipulate the received signal by means of selective wavelength filtering, reflection or polarization or a combination thereof. Using these different reflective or filtering surfaces on movable components of the optomechanical switch, the technology selectively reflects back through one or a number of optical fiber waveguides light having unique properties (e.g., wavelength or polarity) as determined by the position of the switch. As herein disclosed, switches may be designed and configured to be capable of assuming two or more positions and a device can be controlled from one, two or more remote optomechanical switches. Normal operation of the system provides a continuity of light signal independent of the selected switch position reflectively transmitted through the fiberoptic waveguide and received by an optocontrolling transceiver. The wavelengths reflected by the switch are determined by the selected switch position resulting in the subsequent corresponding control of a connected apparatus.

BACKGROUND

Current technology, such as described in U.S. patent Ser. No. 10/001,367, include communications technology between a non-powered remote switch and an apparatus, using optical fiber, whereby only the absence through absorption or presence through reflection of any wavelength of light communicates a switch position to the apparatus. This communication method is limited to two switch positions, and is capable of misinterpreting a switch position when other conditions interfere with the signal (e.g., when the optical fiber is cut, damaged or disconnected, or when foreign contaminants or moisture obscure the reflected light from the reflective surface of the internal switch components).

The herein presented non-powered optomechanical switch and supporting system is able to use multiple, individually distinguishable wavelengths or polarity of light, or both, to communicate two or more positions of the switch to an apparatus. Because multiple light wavelengths can be transmitted to the optomechanical switch, when in one position the switch of the disclosed technology can manipulate the properties of the light so received and reflect one or more wavelengths or polarities, or both, back to the apparatus; when the switch assumes another position, it can reflect different wavelength(s) or polarities, or both, back to the apparatus. By this configuration, a continuous signal is present in all switch positions and received by the optocontrolling transceiver to detect the wavelengths or polarities of the light so received, and direct the apparatus to operate accordingly. Thereby, the presence of a wavelength signal is detectable in all switch positions, with the reflected signal varying among switch positions; no signal evidences disruption of the waveguide or the malfunction of the switch.

By this design, the disclosed technology is able to communicate three or more switch positions through a single optical fiber waveguide. Specifically, because the disclosed technology provides multi-wavelength transmission and optomechanical switch manipulation of these wavelengths selectively reflected back to the optocontrolling transceiver, a third or more switch positions are possible allowing, in some embodiments, a closed-open-closed switch configuration, such as with a three position rocker switch, wherein closed in one direction operates an apparatus in a certain manner; closed in the opposing direction operates an apparatus in another manner; and open causes the apparatus to cease operation while maintaining a bidirectional light signal in all switch positions.

Additionally, the disclosed technology provides a means for more than one optomechanical switch communicating with an optocontrolling transceiver, which switches may be placed remote from one-another. Traditionally, a specific optomechanical switch has been used in a single location and only provided two positions (e.g. closed-open). Through the inclusion of an embodiment of the disclosed technology, two or more switches at different locations in a communications system is possible, providing additional uses of two and three-position optomechanical switches into everyday applications. In the instance of an automobile electrical system, for example, a passenger side power window or door lock can be controlled by a three-position switch located in the driver's door and also by a three-position switch located in the passenger's door. Using the disclosed technology, these two remote location switches may now be linked through the application of an optocontrolling transceiver that processes the change in position of each of the individual switches to control the motors and actuators from two different remote locations. Industry nomenclature refers to a system utilizing two individual switches in different locations controlling a single device as a three-way switch configuration and three switches controlling a device as four-way switch configuration, and so on. An optocontrolling transceiver may be adapted for detecting the switch positions of all switches in a fiber optic circuit of the disclosed technology and control a device accordingly.

Further, because multiple wavelengths may be transmitted by the optocontrolling transceiver, a graduated wavelength reflective scale provided in some embodiments of the disclosed technology reflecting an incremental change between two fixed wavelengths can be utilized for exacting positional detection across the scale of the reflective surface within the switch by the optocontrolling transceiver, thereby providing a precise optical potentiometer. In these and other embodiments, optical detectors and processors can be configured to detect designed allowable thresholds for determining a differentiation between wavelengths of the received signal, and therefore different positions of a multi-position switch or potentiometer.

The disclosed technology further facilitates the use of a second opposable waveguide which passively transmits to an external visual indicator on the switch housing or other structure other visible wavelengths filtered by a reflective surface, varying in wavelength based upon the reflective surface positioned at the distal end of the wave guide determined by the position of the switch, thereby visually conveying the switch position at the switch (or other location) through a change in a displayed color via an indicator.

By the novel concepts presented herein, a system incorporating the disclosed technology has a broad range of applications, including operational control of electrical lighting and appliance hardware, directional and positional awareness for autonomous systems and fail-safe industrial interlocking functions for safety and security applications as well as new mission critical passive optomechanical position switch systems. Additional benefits will be explained further in and become apparent through the following description and drawings.

GENERAL DESCRIPTION

The disclosed technology includes a non-powered, optomechanical position switch for controlling an apparatus by receiving and reflecting light through an optical fiber waveguide, wherein in reflecting the light the switch manipulates one or more properties of the received light based upon a position of the switch, and the manipulated light so reflected traverses back through the optical fiber waveguide to the apparatus. Manipulation of the light occurs by means of a plurality of reflective surfaces, each reflective surface uniquely manipulating one or more properties of light received from the waveguide and reflecting the manipulated light back through the waveguide. The reflective surfaces are supported by an orientable structure positioned near or at the end of the waveguide, so that based upon the orientation of the orientable structure, one of the plurality of reflective surfaces is selectively positioned at the end of the waveguide, thereby determining what properties of light are manipulated by the switch and communicated to the apparatus.

The orientable structure may be coupled with a mechanical element, movable between at least two positions. In this configuration, the switch position of the mechanical element determines the orientation of the orientable structure, and thereby selectively determines which of the plurality of reflective surfaces is positioned at or near the end of the waveguide, which directs what properties of light are manipulated and reflected back to the apparatus.

Further, a terminus of a first optical fiber waveguide is supported relative to the orientable structure, so that as the orientable structure orients (by movement of the mechanical element, or otherwise) one of a plurality of reflective surfaces is at the terminus of the optical fiber waveguide.

The disclosed technology further includes an operational control system for controlling an apparatus, including an optical fiber waveguide, a non-powered optomechanical position switch and an optocontrolling transceiver designed for coupling with and controlling a state of the apparatus. The non-powered optomechanical position switch includes an orientable structure supporting a plurality of reflective surfaces at the terminus of the optical fiber waveguide. Each of the reflective surfaces uniquely manipulates one or more properties of light received from the optical fiber waveguide in reflecting light back through the optical fiber waveguide to the optocontrolling transceiver. Orienting the orientable structure relative to the terminus of the optical fiber waveguide selectively determines which of the plurality of reflective surfaces is positioned at the terminus of the optical fiber waveguide, and thereby what properties of light are manipulated by the switch and reflected back through the waveguide to the transceiver. A mechanical element may be coupled with the orientable structure, to facilitate orientation thereof. The optocontrolling transceiver generates and receives light to and from the optical fiber waveguide, detecting the properties of the light received, and controlling an operational state of the apparatus based upon the properties of the light received.

The disclosed technology further includes an operational control system for controlling an apparatus, including at least two optical fiber waveguides and at least two non-powered optomechanical position switches. Each of the switches includes an orientable structure supporting a plurality of reflective surfaces at a terminus of one of the optical fiber waveguides. In this system, at least some of the reflective surfaces each uniquely manipulates one or more properties of light received from the corresponding optical fiber waveguide in reflecting light back through the optical fiber waveguide to the apparatus. Orienting the orientable structure relative to the terminus of the optical fiber determines which of the plurality of reflective surfaces is positioned at the terminus of the optical fiber waveguide. This system further includes an optocontrolling transceiver designed for coupling with the apparatus, which generates and receives light to and from the optical fiber waveguides, detects the properties of the light received, and controls an operational state of the apparatus based upon the properties of the light received.

The disclosed technology further includes an optocontroller useful for controlling operation of an apparatus. The optocontroller includes a transceiver, a processor and a switching controller. The transceiver of the optocontroller includes a wavelength generator for generating a light signal for transmission through an optical fiber waveguide to at least one non-powered optomechanical position switch remote from the apparatus, and a plurality of photodetectors, a spectrometer or camera system such as a charge couple device hereinafter known as a CCD, or a complementary metal oxide semiconductor hereinafter known as a CMOS device, to perceivably detect the properties of the light reflected back through the optical fiber waveguide. The non-powered optomechanical position switch directionally reflects back to the optocontrolling transceiver light having selective properties based upon the position of the switch. The processor determines the properties of light received by the optocontrolling transceiver, and communicates the same to the switching controller, which based upon signals received controls the operation of the apparatus coupled with the optocontroller.

FIGURES

Enclosed are figures indicating applications for use and details accompanying specifications for some of the components of embodiments of the non-powered optomechanical switch and optical system of the disclosed technology. A brief description of the drawings are as follows.

Figure 29:
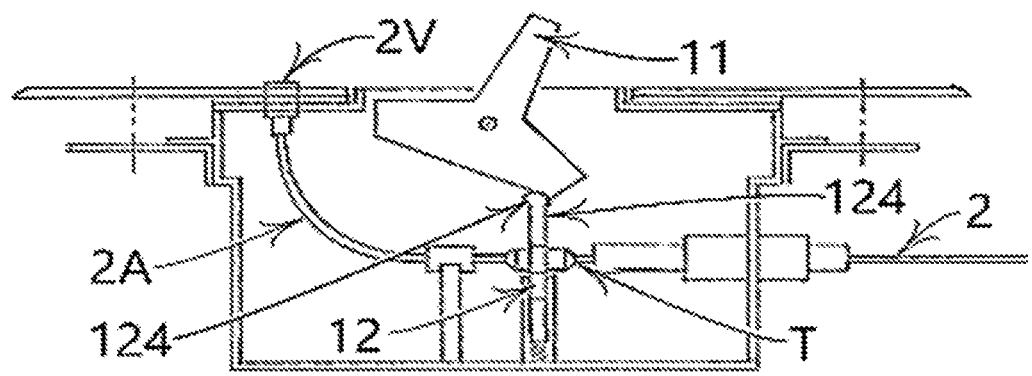
FIG. 29 is a side view of another embodiment of a toggle style switch of the disclosed technology, further including a visual indicator.
Figure 31:
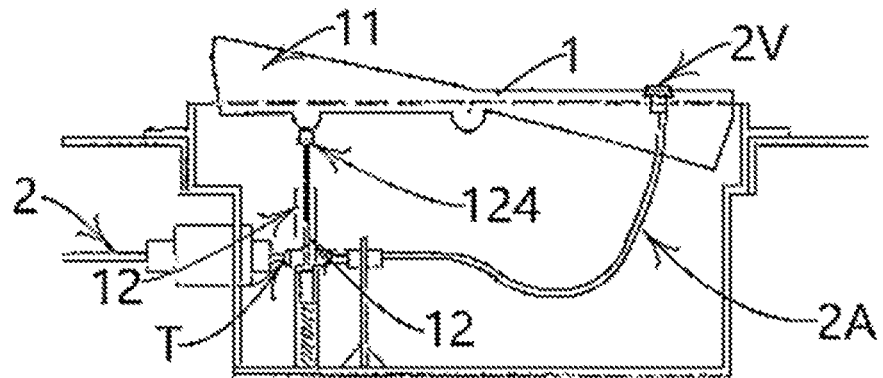
FIG. 31 is a side view of another embodiment of a paddle style switch of the disclosed technology, further including a visual indicator.
Figure 34:
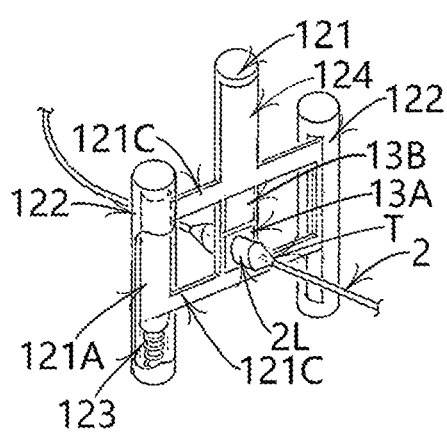

FIG. 34 is an oblique view of another embodiment of a slide actuator carriage frame having two reflective surfaces in accordance with the teachings of the disclosed technology useful with, for example, the toggle or paddle style switches of FIGS. 29 and 31, the frame being represented in a first position further including an opposing waveguide communicating a switch position through a visual color of an indicator waveguide.

Figure 32:
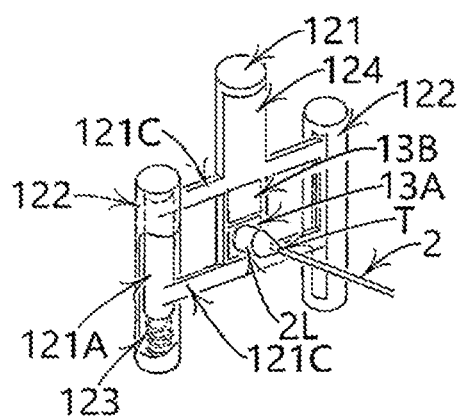
FIG. 32 is an oblique view of an embodiment of a slide actuator carriage frame having two reflective surfaces in accordance with the teachings of the disclosed technology useful with, for example, the toggle or paddle style switches of FIGS. 28 and 30, the frame being represented in a first position.
Figure 33:
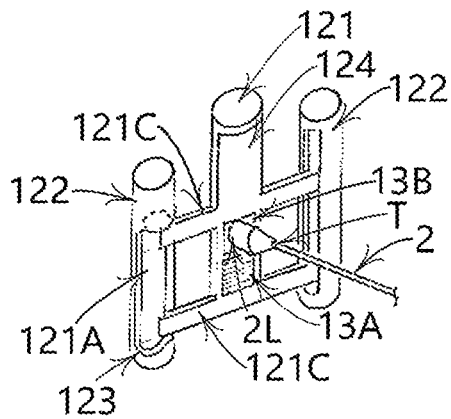
FIG. 33 is an oblique view of the side actuator carriage frame of FIG. 32, represented in a second position.
Figure 35:
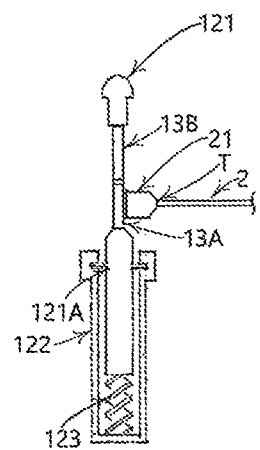

FIG. 35 is an oblique view of the slide actuator carriage frame of FIGS. 32 and 33 being represented in a first position.

FIG. 36 is an oblique view of the slide actuator carriage frame of FIG. 33 being represented in a second position.

FIG. 37 is an oblique view of the slide actuator carriage frame of FIG. 34 further including a visual indicator waveguide.

FIG. 38 is a side view of another embodiment of a paddle style or rocker switch of the disclosed technology.

Figure 39:
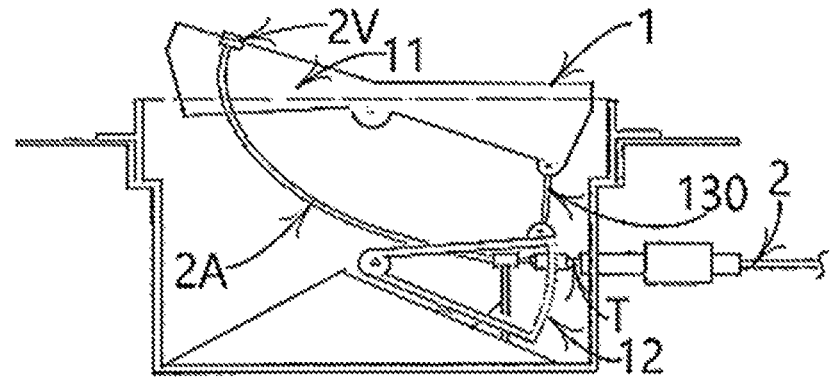

FIG. 39 is a side view of another embodiment of a paddle style or rocker switch of the disclosed technology, further including a visual indicator.

Figure 40:
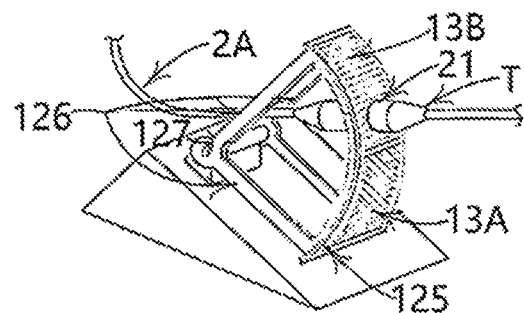

FIG. 40 is an oblique view of an embodiment of a pivoting carriage frame assembly having two reflective surfaces in accordance with the teachings of the disclosed technology useful with, for example, the toggle or paddle style switches of FIG. 38, the assembly being represented in a first position.

Figure 41:
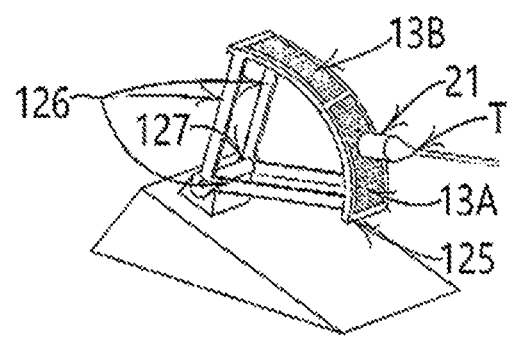

FIG. 41 is an oblique view of the pivoting carriage frame assembly of FIG. 40, the assembly being represented in a second position.

Figure 42:
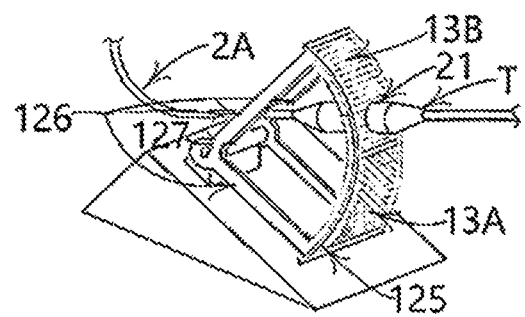

FIG. 42 is an oblique view of another embodiment of a pivoting carriage frame assembly having two reflective surfaces in accordance with the teachings of the disclosed technology and a visual indicator, useful with, for example, the toggle or paddle style switches of FIG. 39, the assembly being represented in a first position.

Figure 43:
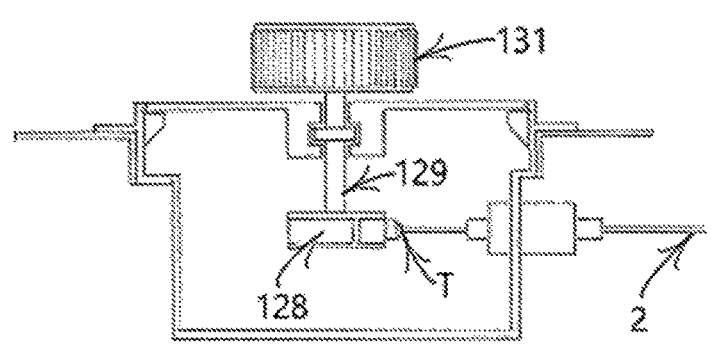

FIG. 43 is side view of an optical potentiometer in an embodiment of the disclosed technology.

Figure 44:
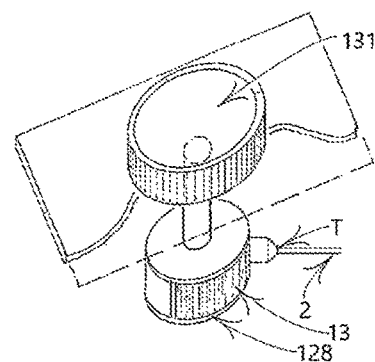

FIG. 44 is an oblique view of the optical potentiometer of FIG. 43.

Figure 45:
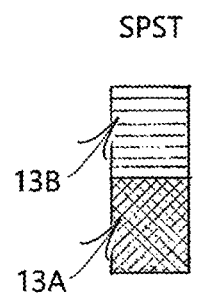

FIG. 45 is a flat view of two reflective surfaces of the disclosed technology, using wavelength reflection and filtering as utilized in a slide actuator and pivoting carriage frame assemblies.

Figure 46:
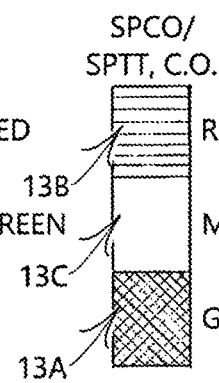

FIG. 46 is a flat view of three reflective surfaces of the disclosed technology, using wavelength reflection and filtering.

Figure 47:

FIG. 47 is a flat view of two reflective surfaces of the disclosed technology, using polarization reflection.

Figure 48:
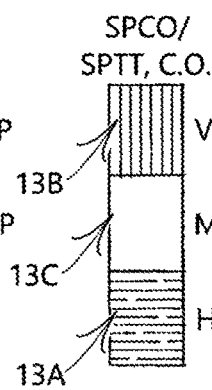

FIG. 48 is a flat view of three reflective surfaces of the disclosed technology, using polarization reflection.

Figure 49:
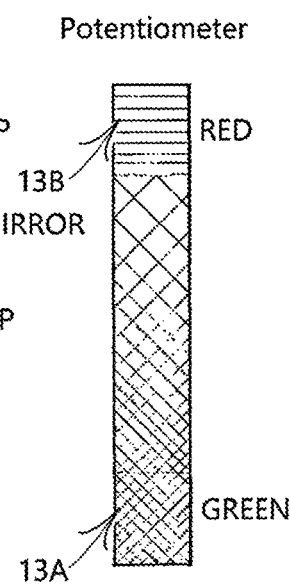

FIG. 49 is a flat view of a reflective surface having incrementally graduated wavelength reflective scale of the disclosed technology.

Figure 50:
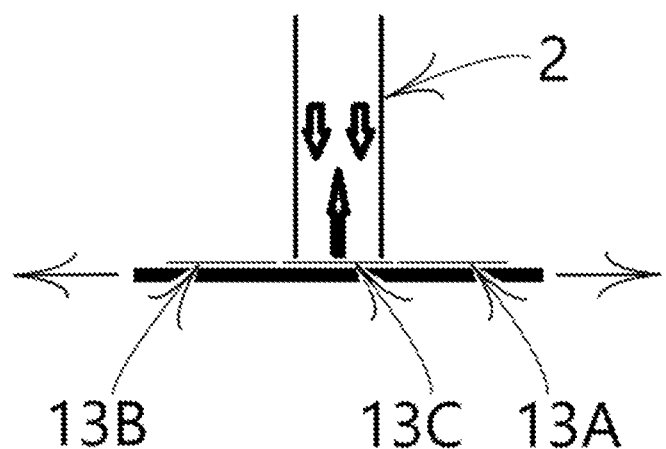

FIG. 50 is a representation of light waves traversing the waveguide, at a reflective surface of a three-position switch actuator of the disclosed technology including a waveguide terminus reflectively redirecting select wavelengths back through the waveguide to the optocontrolling transceiver.

Figure 51:
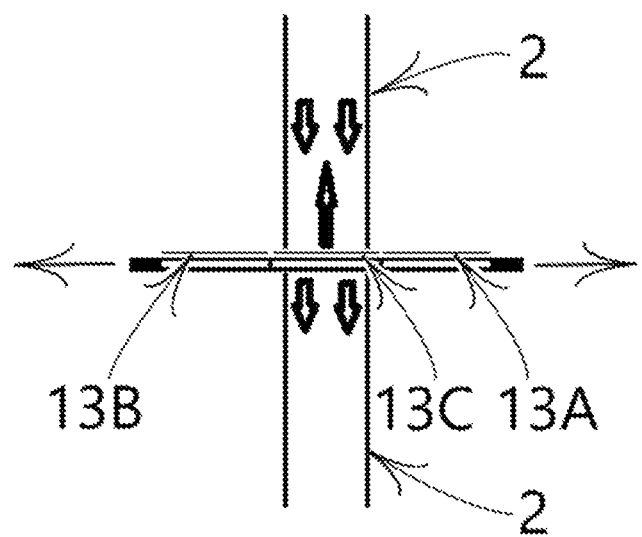

FIG. 51 is another embodiment representing light waves traversing the waveguide, at a reflective surface of a three-position actuator of the disclosed technology utilizing three individual filtering surfaces such as band-pass or dichroic filters that reflect selective wavelengths, and transmit through the filter other wavelengths to a second waveguide and displaying a respective color on a visual indicator.

Figure 52:
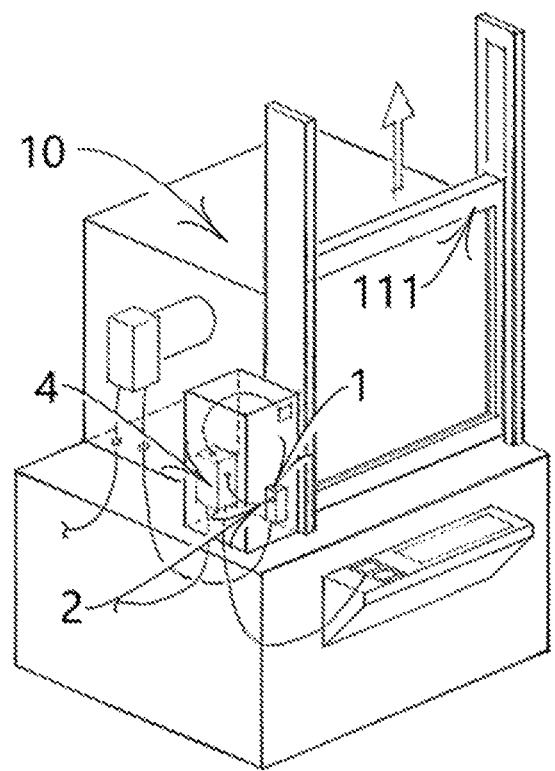

FIG. 52 is a peripheral view of an optical safety lockout position switch incorporating embodiments of the disclosed technology, useful with manufacturing equipment.

Figure 53:
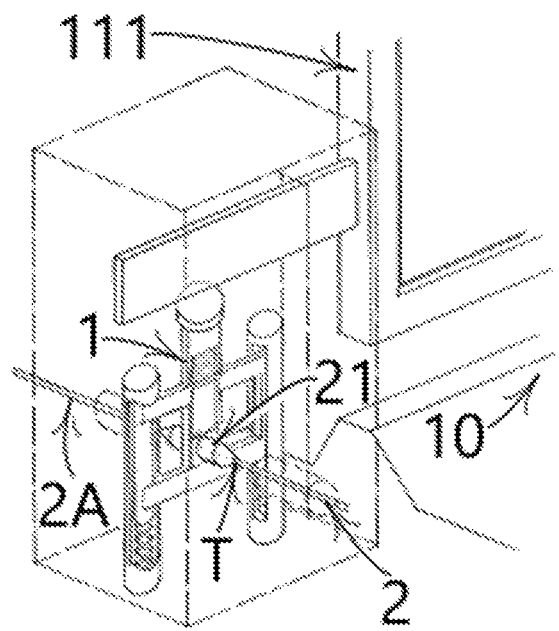

FIG. 53 is a peripheral view of an embodiment of a reciprocating three position optomechanical switch of the disclosed technology for use in user protection equipment such as the optical safety lockout embodiment of FIG. 52.

Figure 54:
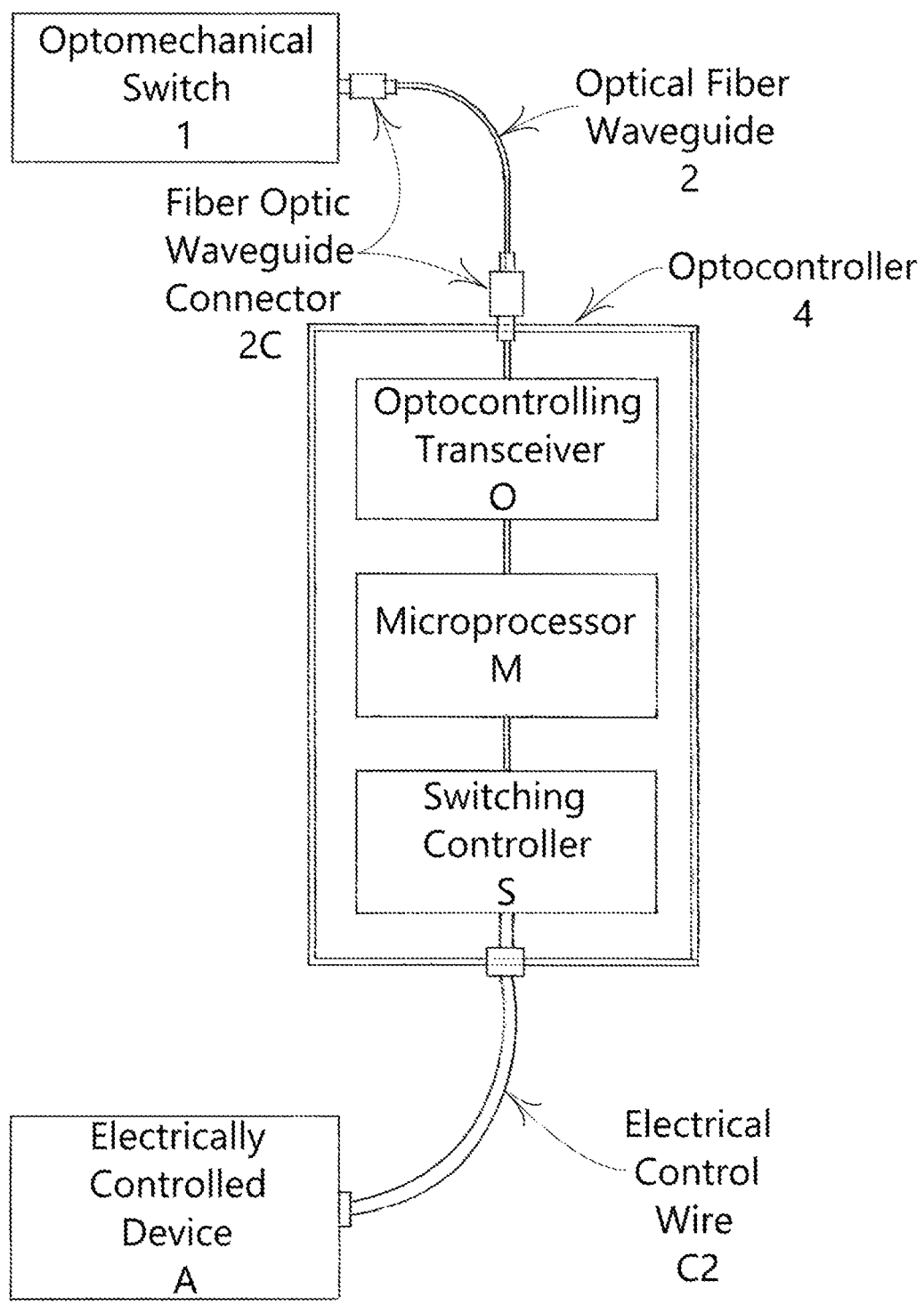

FIG. 54 is a block diagram schematic of an embodiment representing an optocontrolling transceiver of the disclosed technology.

DETAILED DESCRIPTION

As shown in the figures, the disclosed technology includes a non-powered, optomechanical position switch 1 for controlling an apparatus A by receiving and reflecting light through an optical fiber waveguide 2. In some embodiments a second optomechanical switch is provided for a secondary device control location, as in a three-way switch configuration. In reflecting the light each switch independently manipulates one or more properties of the received light based upon a position of the switch, and the manipulated light so reflected traverses back through the optical fiber waveguide to the apparatus.

The disclosed technology further includes an operational control system for controlling an apparatus A, including an optical fiber waveguide 2, one or more non-powered optomechanical position switches 1, and an optocontrolling transceiver 4 designed for coupling with and controlling the apparatus, as shown in the figures.

Figure 20:
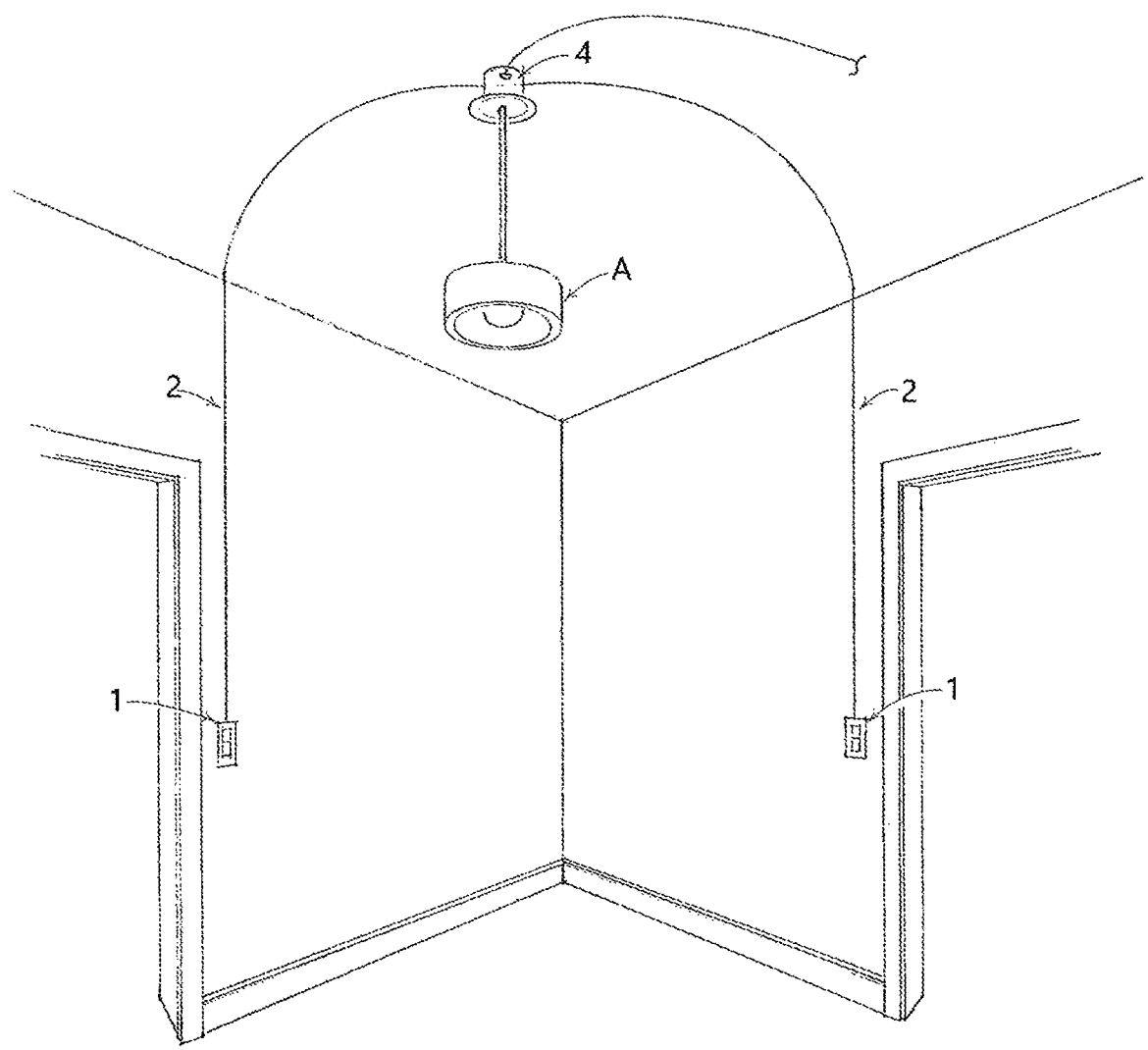
FIG. 20 is a perspective view of a room in a home or business, including an embodiment of a fiber optic switch wiring circuit of the disclosed technology.

Provided in FIG. 20 is an example of a wiring circuit as might be found in a home or business. The multi-wavelength optic switching circuit and non-powered passive optomechanical switches 1 of the disclosed technology may be used to replace the traditional electrical switch wiring. In this configuration, the non-powered optomechanical switches 1 are connected to an optocontrolling transceiver 4 coupled with the light fixture A by low cost single optical fiber waveguides 2.

As shown in the embodiments of FIGS. 12-15, 28-31, 38-39, 43-44, and the component FIGS. 6-11, 16-19, 32-37, 40-42, 45-49, the non-powered optomechanical position switch 1 of the disclosed technology includes an orientable structure 12 supporting a plurality of reflective surfaces (e.g., 13A, 13B, etc.) positionable at the terminus T of the optical fiber waveguide 2. Manipulation of the light received from and reflected back through the waveguide occurs by means of the reflective surfaces, each reflective surface uniquely manipulating one or more properties of light, as hereinafter described. By orientation of the orientable structure, a single reflective surface is selectively positioned at the terminus of the waveguide, thereby determining the properties of light manipulated and reflected back through the waveguide.

The orientable structure may be a spring-loaded carriage assembly, such as shown in FIGS. 6-11 and 32-37, which includes a carriage 121 supporting a plurality of reflective surfaces 13A, 13B, and in some embodiments 13C, and a pair of guide cylinders 122, facilitating and controlling movement and orientation of the carriage. In this embodiment, the carriage comprises a pair of posts 121A, each post being movably housed within the channel of a guide cylinder. The posts 121A are connected by means of one or more crossbars 121C, and the reflective surfaces 13A, 13B (and 13C, when present) are centrally secured between the crossbars. To accommodate movement of the carriage relative to the guide cylinders, the guide cylinders have slits on one side thereof to allow the crossbars of the carriage to move with the posts, as the posts slide up and down in the guide cylinder channels. A spring 123 is provided at the bottom of each of the guide cylinders to force the posts into an upward position, to a top surface of the guide cylinder, when an opposing force is not provided on the carriage, as hereinafter described.

Figure 8:
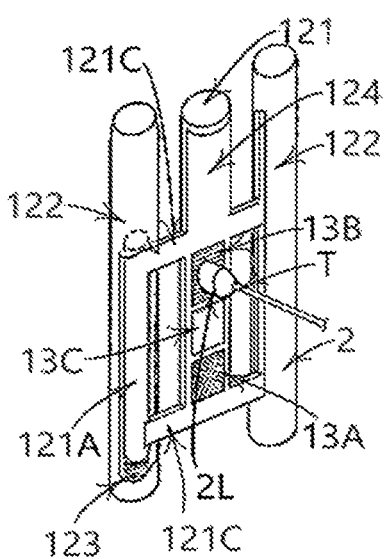
FIG. 8 is an oblique view of the slide actuator carriage frame of FIGS. 6 and 7, represented in a third position.
Figure 9:
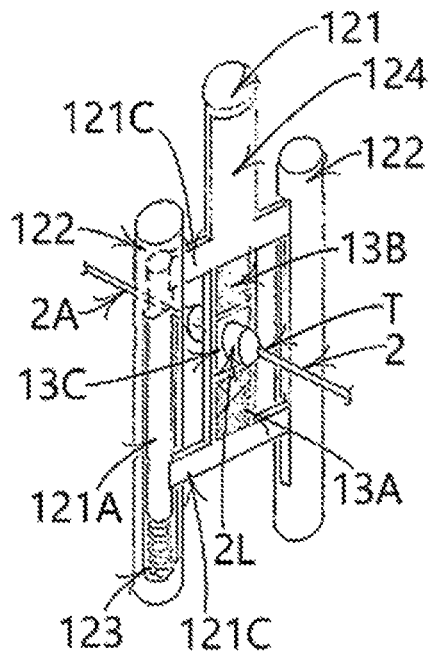
FIG. 9 is an oblique view of an embodiment of a slide actuator carriage frame having three reflective surfaces in accordance with the teachings of the disclosed technology, further including a visual indicator and useful with, for example, the momentary rocker three-position switch of FIGS. 4 and 5.
Figure 10:
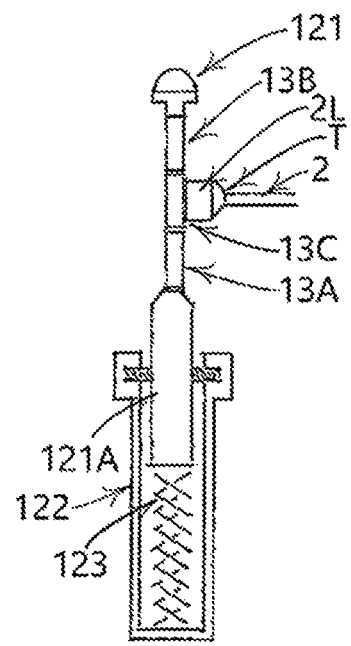
FIG. 10 is a side view of the slide actuator carriage as depicted in FIGS. 2, 3, and 6-8.
Figure 11:
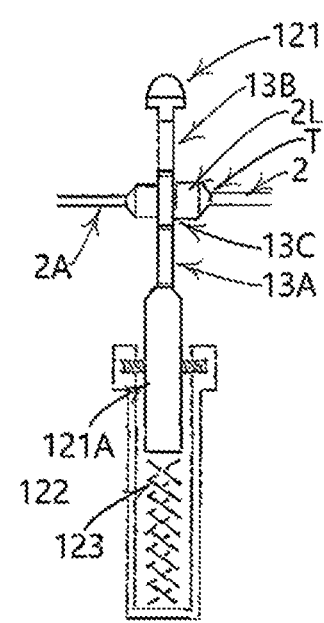
FIG. 11 is a side view of the slide actuator carriage as depicted in FIGS. 4, 5, and 9.
Figure 12:
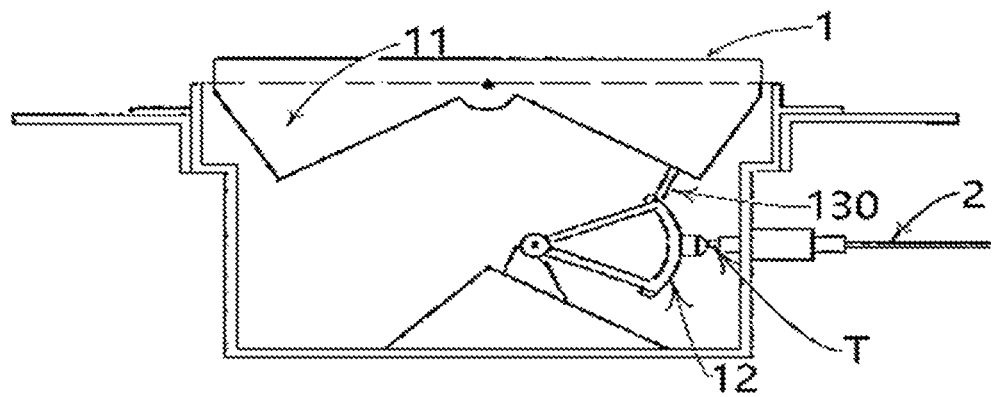
FIG. 12 is a side view of an embodiment of a three-position rocker switch of the disclosed technology, including a pivoting carriage frame and represented in a first position.
Figure 13:
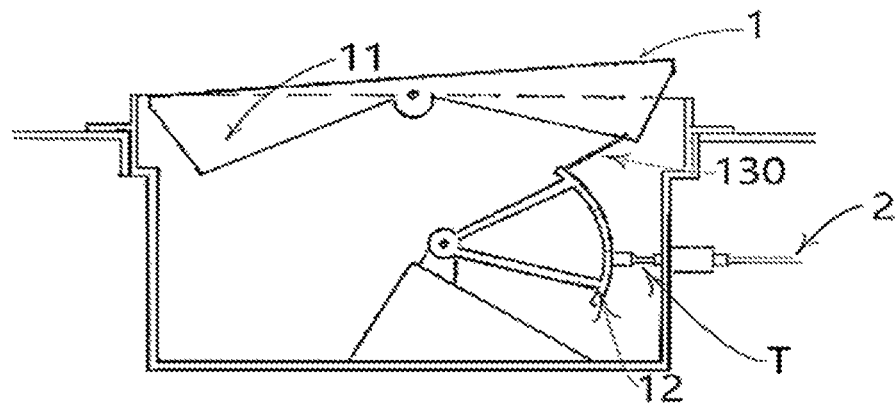
FIG. 13 is a side view of the three-position rocker switch of FIG. 12, represented in a second position.
Figure 14:
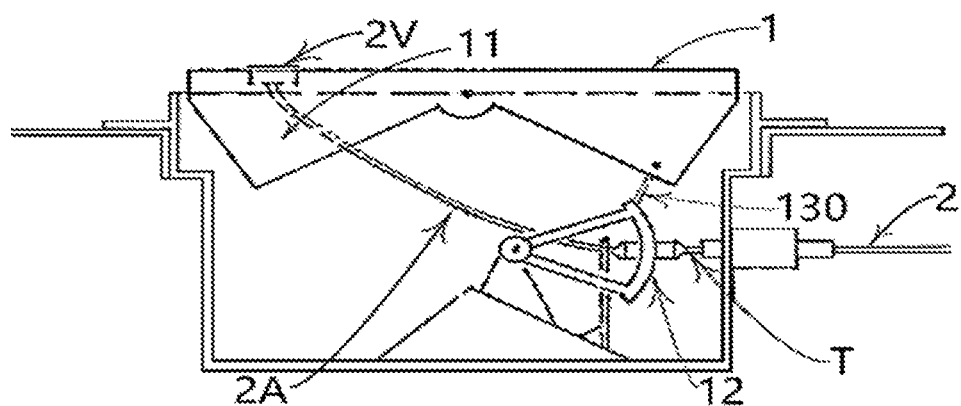
FIG. 14 is a side view of another embodiment of a three-position rocker switch of the disclosed technology, including a pivoting carriage frame with a visual indicator, represented in a first position.
Figure 15:
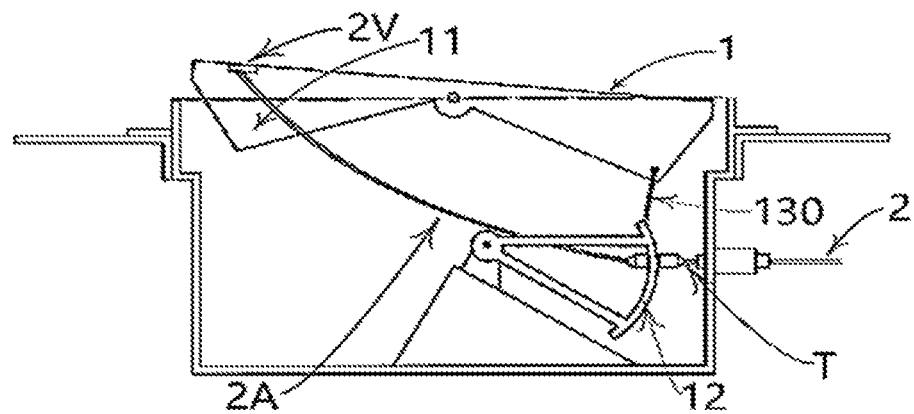
FIG. 15 is a side view of the three-position rocker switch of FIG. 14, represented in a third position.
Figure 16:
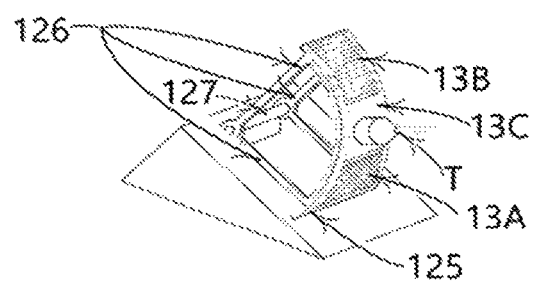
FIG. 16 is an oblique view of a pivoting carriage frame having three reflective surfaces in accordance with the teachings of the disclosed technology useful with, for example, the three-position rocker switch of FIGS. 12 and 13, the frame being represented in a first position.
Figure 17:
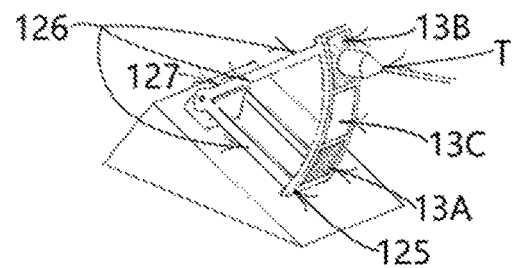
FIG. 17 is an oblique view of the pivoting carriage frame of FIG. 16, represented in a second position.
Figure 18:
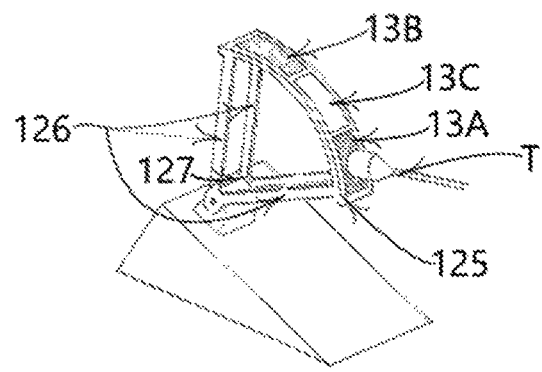
FIG. 18 is an oblique view of the pivoting carriage frame of FIGS. 16 and 17, represented in a third position.
Figure 19:
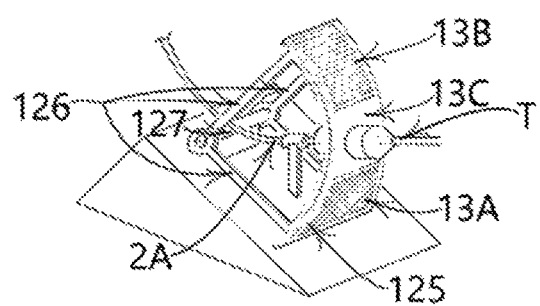
FIG. 19 is an oblique view of a pivoting carriage frame having three reflective surfaces in accordance with the teachings of the disclosed technology useful with, for example, the three-position rocker switch of FIGS. 14 and 15, the frame being represented in a first position further including an opposing waveguide communicating a switch position through a visual color of an indicator waveguide.

The carriage further includes a control post 124 to control orientation of the carriage relative to the terminus of the waveguide; in the embodiment shown, the control post 124 is affixed to the top crossbar 121C. By this configuration, the post may be at rest in a first position as shown in FIGS. 7, 32, 34, 35 and 37, causing a first reflective surface 13A to be positioned relative to the waveguide 2; when the post is depressed against the springs 123 it causes the carriage to reorient downwards thereby causing a second reflective surface 13C to be positioned relative to the terminus of the waveguide 2 (as shown in FIGS. 6, 9, 10, 11, 33 and 36, for example). In the embodiments shown in FIGS. 6-11, the control post may further orient the orientable structure to a third position so that a third reflective surface 13B is positioned relative to the waveguide (as shown in FIG. 8, for example).

In another embodiment, the orientable structure may be a pivoting carriage assembly, such as shown in FIGS. 12-15 and 38-39 and the component FIGS. 16-19 and 40-42 which includes an arced member 125 upon which the reflective surfaces 13A, 13C and in some embodiments 13B are secured. The arced member is supported by a plurality of arms 126, with a crossbar 127 there-between, and hingedly secured to the switch housing or another structure. As the arced member rotates about the hinge, the orientation thereof relative to the terminus of the waveguide determines which reflective surface is positioned at the end of the waveguide (see, e.g., FIGS. 16-19).

By these configurations and teachings, additional reflective surfaces may be supported by the orientable structure, positionable relative to the waveguide terminus.

In another embodiment, as depicted in FIGS. 43 and 44, the orientable structure is a rotary assembly which includes a cylindrical support structure 128, with reflective surfaces 13 along and about the depth of the cylinder. In this embodiment, as the cylindrical support structure rotates about an axis 129, it orients one of a plurality of reflective surfaces relative to the terminus of the waveguide. Notably, in this and other embodiments the reference to reflective surfaces, in the plural, may be a single surface with varying reflective and filtering properties along the length of and integral with the surface.

As shown in FIGS. 2-19 and 28-49, and hereinabove described, the orientable structure 12 supports a plurality of reflective surfaces (e.g., 13, 13A, 13B, 13C). Each reflective surface uniquely and selectively manipulates one or more properties of light received from the optical fiber waveguide in reflecting light back through the optical fiber waveguide to the apparatus. Orienting the orientable structure relative to the terminus T of the optical fiber positions one of the plurality of reflective surfaces at the terminus of the optical fiber waveguide; reorienting the orientable structure relative to the terminus of the optical fiber positions another of the plurality of reflective surfaces at the terminus of the optical fiber waveguide. By this configuration, the properties of the light reflected back through the waveguide communicates the position of the switch (orientation of the orientable structure) to the apparatus.

FIGS. 45-49 are representations of the various examples of combinations of reflective surfaces useful in the disclosed technology. In the embodiment of FIG. 45, an example of a two-position switch of the disclosed technology is shown, with the top reflective surface 13B being a selective wavelength surface reflective material or bandpass or dichroic filter which reflects only red wavelengths (e.g., 564-580 nm) back through the waveguide, and the bottom reflective surface 13A being a selective wavelength surface reflective material or bandpass or dichroic filter which reflects only green wavelengths (e.g., 534-545 nm) back through the waveguide. FIG. 46 adds a third reflective surface 13C useful for a three-position switch, wherein the third surface in this example is a mirror, reflecting all wavelengths back through the waveguide without manipulating any properties of the light received, although another reflective surface that reflects a selected wavelength differentiated from the others may be so positioned utilizing similar attributes as above. An embodiment of the reflection on a reflective surface of a three-position switch of the disclosed technology is shown in FIG. 50. Additional reflective surfaces can be added to the orientable structure to communicate additional information by selective manipulation and reflection of light back through the waveguide.

In a similar exemplary embodiment, FIG. 47 is a representation of two polarizing reflective surfaces useful with a two-position switch. The top reflective surface 13B represents a vertical polarizing filter or polarizing reflector and the bottom reflective surface 13A represents a horizontal polarizing filter, each for reflecting polarized light through the waveguide. FIG. 48 is an exemplary representation of three reflective surfaces useful with a three-position switch, adding a mirror 13C to the embodiment shown in FIG. 47, wherein the additional reflective surface (mirror) reflects nonpolarized light back through the waveguide.

In these and other embodiments the reflective surfaces may both filter and reflect different wavelengths of light, or polarizations or a combination thereof and reflect back light through the waveguide, to selectively manipulate both the wavelength and the polarity of the light reflected back through the waveguide, extending the manipulative communication capabilities of the disclosed technology.

Finally, in configurations such as the rotary assembly hereinabove described, as shown in FIGS. 43 and 44, the plurality of reflective surfaces may be one or more reflective surfaces having a gradual increment in reflected wavelengths or polarizations or a combination thereof along its surface as shown in the exemplary embodiment of FIG. 49. In this embodiment, one end of the surface reflects the red wavelengths, and the other end of the surface reflects green wavelengths, and between the two ends the reflection gradually moves from the red wavelength to the green wavelength. Thereby, the disclosed technology can be used for exacting positional awareness and as dimmer control or potentiometer device, or a similar device.

As herein described, selective wavelength surface reflective material or bandpass or dichroic filters with selective wavelength reflection and polarizing filters or polarizing reflectors are useful as the reflective surfaces of the disclosed technology; mirrors are also useful in combination with the filters.

In some embodiments a collimating lens 2L is positioned at the terminus of the waveguide to refocus the light received and maximize the light reflected back through the optical fiber waveguide for detection by the optocontrolling transceiver. The collimating lens, as represented in FIGS. 2-19 and 28-44 and located at the terminus of the waveguide within the optomechanical switch provides a housing for the lens assembly. The collimating lens may be a prism, convex or concave lens or a combination thereof for the purpose of bidirectional focusing of the light beam from or into a optical fiber waveguide.

In some embodiments, the optomechanical switch further includes a mechanical element 11, which is movable between at least two positions. The mechanical element is coupled with the orientable structure 12 so that the position of the mechanical element controls the orientation of the orientable structure and thereby selects the reflective surface positioned at the terminus of the waveguide, which determines the properties of light reflected back to the apparatus by means of the disclosed technology. Exemplary mechanical elements suitable for use in the disclosed technology include toggle style switches, as shown in FIGS. 28-29, paddle or rocker style switches, as shown in FIGS. 2-5, 12-15, 30-31, and 38-39, and rotatable elements, as shown in FIGS. 43-44.

Figure 28:
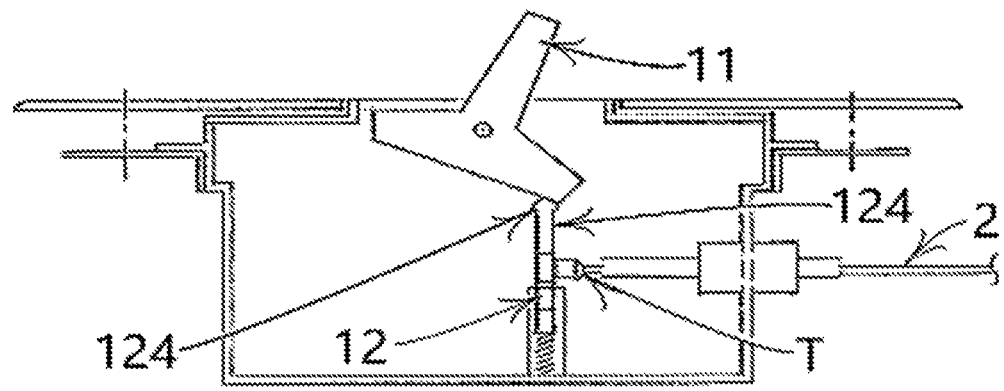
FIG. 28 is a side view of an embodiment of a toggle style switch of the disclosed technology.

In an embodiment including a toggle style switch mechanical element, as shown in FIGS. 28-29, the switch in one position pushes down on the control post 124 of the spring-loaded carriage assembly, causing the carriage to move down and, as hereinabove described, positioning a first reflective surface 13A relative to the terminus of the waveguide 2. When the switch moves to a second position, the control post is no longer depressed, and the springs of the assembly pushes the carriage up, positioning a second reflective surface 13B relative to the terminus of the waveguide 2. Likewise, the toggle switch may be engaged with the pivoting carriage assembly, so that movement of the toggle switch translates into movement of the pivoting carriage assembly, thereby determining the orientation thereof and which reflective surface is positioned at the terminus of the waveguide.

Figure 30:
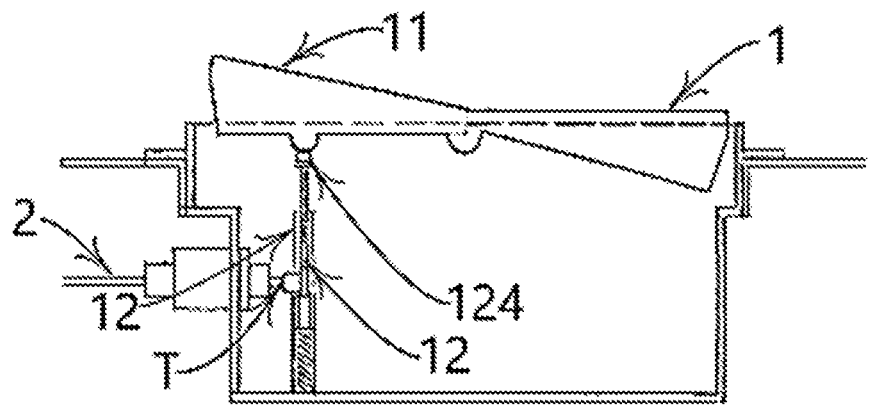
FIG. 30 is a side view of an embodiment of a paddle style switch of the disclosed technology.

Another embodiment includes a paddle mechanical element, as shown in FIGS. 30, and 31. In this embodiment, one end of the paddle pushes down on the control post 124 of the spring-loaded carriage assembly, causing the carriage to move down and, as hereinabove described, positioning a first reflective surface 13A relative to the terminus of the waveguide; when the paddle moves to a second position, the control post is no longer depressed, and the springs of the assembly push the carriage up, positioning a second reflective surface 13B relative to the terminus of the waveguide. Likewise, as shown in FIGS. 12-15 and 38-39, the paddle may be engaged with an arm 126 of the pivoting carriage assembly, by means of for example a linking bar 130, hingedly connected by pins to both the switch and the pivoting carriage assembly, so that movement of the paddle translates into movement of the pivoting carriage assembly, thereby determining the orientation thereof and which reflective surface is positioned at the terminus of the waveguide.

Figure 3:
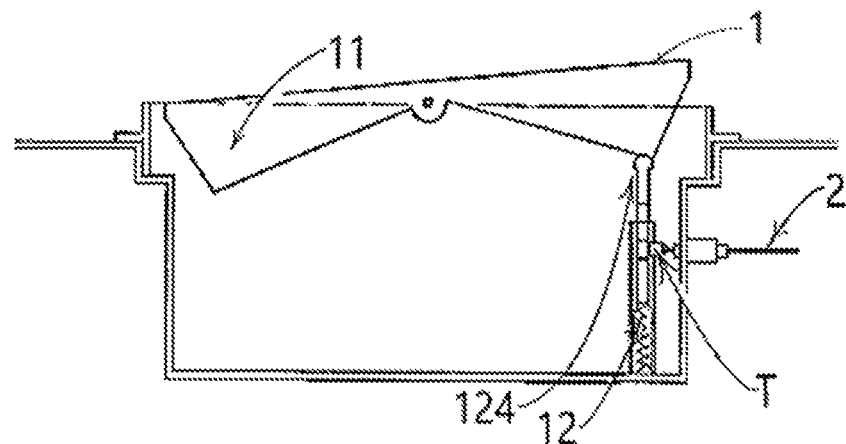
FIG. 3 is a side view of the momentary rocker three-position switch of FIG. 2, represented in a second position.
Figure 4:
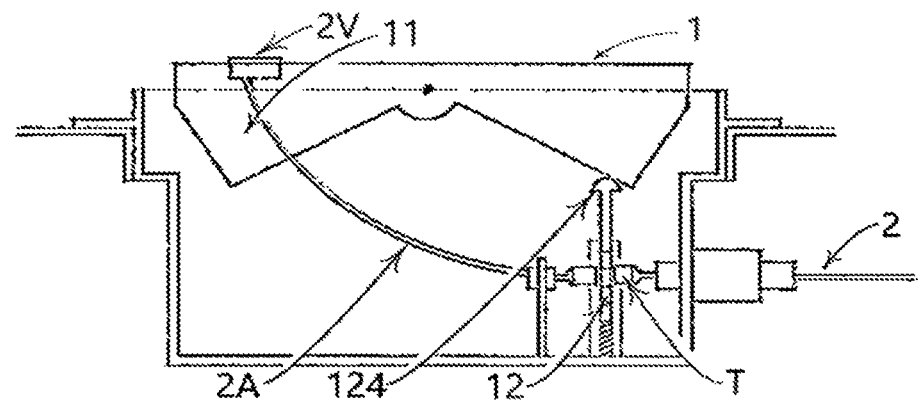
FIG. 4 is a side view of another embodiment of a momentary rocker three-position switch of the disclosed technology, represented in a first position and further including a visual indicator.
Figure 5:
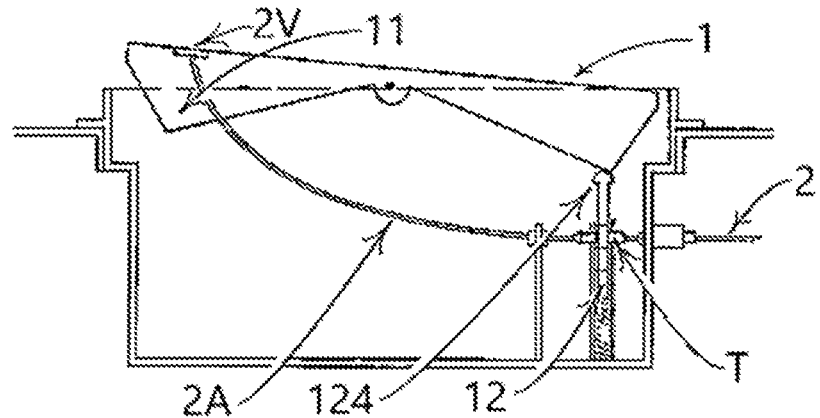
FIG. 5 is a side view of the momentary rocker three-position switch of FIG. 4, represented in a third position and further including a visual indicator.
Figure 6:
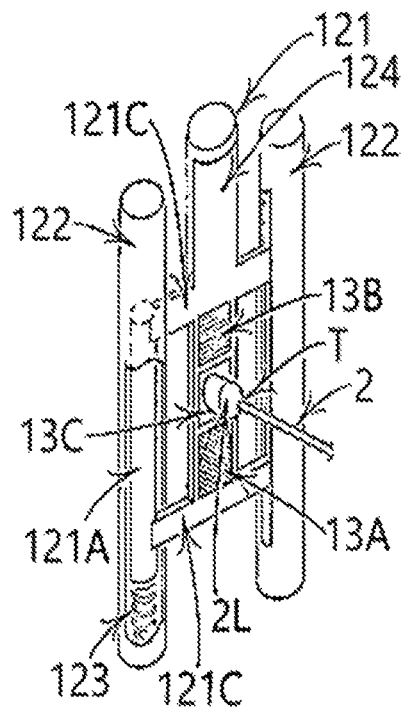
FIG. 6 is an oblique view of an embodiment of a slide actuator carriage frame having three reflective surfaces in accordance with the teachings of the disclosed technology useful with, for example, the momentary rocker three-position switch of FIGS. 2 and 3, represented in a first position.
Figure 7:
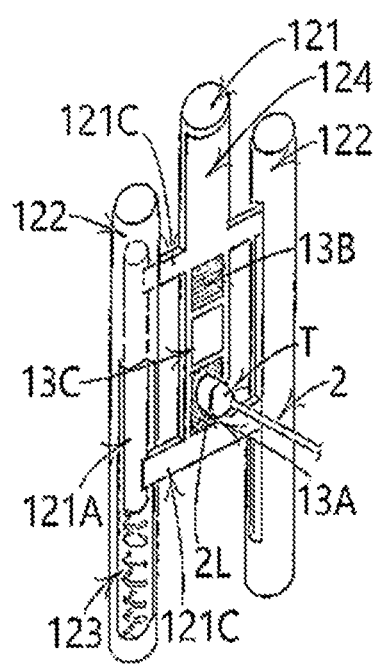
FIG. 7 is an oblique view of the slide actuator carriage frame of FIG. 6, represented in a second position.

In another embodiment, as depicted in FIGS. 2-5, the mechanical element is a momentary rocker coupled with a spring-loaded carriage assembly having three reflective surfaces supported thereon, such as those detailed in FIGS. 46 and 48. In this configuration, the momentary rocker and the orientable structure each have three distinct positions, with the reflective surface 13C in the middle position or a first position, associated with the switch being in the open/off or spring center rested position. This surface may be a reflective surface that reflects different bandpass or dichroic filters with selective wavelength reflection reflective material, or bandpass or dichroic filters with selective wavelength reflection, or a mirrored surface that reflects all wavelengths back to the optocontrolling transceiver, communicating on open/off state. The rocker can be activated in a second position (see, e.g., FIG. 5) coinciding with the slide second position and the reflective surface 13A would reflect one wavelength or band of wavelengths back to the transceiver, communicating a first closed/on state. In this embodiment, the momentary switch would return to the rest or in the center first position and communicating an open/off state to the transceiver. Moving the rocker to a third position would move the orientable structure to the corresponding third position, and the reflective surface 13B would be positioned at the end of the waveguide based upon this orientation of the orientable structure, such as shown in FIG. 3 would reflect a different wavelength or band of wavelengths back to the transceiver, communicating a second closed/on state.

Similar to other embodiments, FIGS. 12-15 depict a three-position rocker as hereinabove described may be coupled with a pivoting carriage assembly as the orientable structure by means of a linking element 130, with the pivoting carriage assembly having three reflective surfaces affixed thereto (a detailed view of which is shown in FIGS. 46 and 48).

In another embodiment, as shown in FIGS. 43 and 44, an optical potentiometer is provided which may be used in commercial and residential dimmer style rheostat switches. These figures show a side and oblique rendering of the orientable structure as an optical potentiometer reflecting wavelength frequencies through a plurality of bandpass or dichroic filters with selective wavelength surface reflective material or bandpass filter media or dichroic filters across a variably graduated wavelength reflective scale between two predetermined opposing end wavelength filters or reflectors of the mechanism. A rotatable element 131 such as a second cylinder may be affixed to the central axis 129 of the cylindrical support structure 128 having reflective surfaces 13 along and about the depth of the cylinder (see, e.g., FIG. 49), to facilitate movement of the cylindrical support structure. Rotation of the second cylinder can thereby determine which reflective surface is positioned at the terminus of the waveguide, and thereby communicate a position of a switch ranging from a closed state to an open state and all positionally measurably detected attitudes differentially determined by the optocontroller. This potentiometer can be utilized in lighting appliance dimmer controls or for conveying a varying measured state, among other purposes.

In some embodiments, switches of the disclosed technology may be configured with two or more fiber optic waveguides, one of which transmits light signals to the switch, and the second (or more) of which transmits reflected light from the switch. In these embodiments, angular reflection would be incorporated into the reflective surface, or result from the positioning of the optical waveguides, or position of the orientable structure, such that light received from the first fiber optic waveguide is reflected to the second (or more) fiber optic waveguide(s), by means of the reflective surface at the terminus of each of the waveguides. The second fiber optic waveguide may be coupled with the original transceiver generating light transmitted through the first fiber optic waveguide, or may be coupled with another receiver at a remote location.

In some embodiments, the switch further includes means to passively transmit the unreflected or filtered wavelengths of light through a secondary opposing waveguide 2A to a visual indicator 2V on the external face of the switch (as shown in FIGS. 4, 5, 9, 11, 14, 15, 19, 29, 31, 34, 37, 39). As hereinabove described, the reflective surfaces may be selected to selectively reflect certain wavelengths or band of wavelengths of light back through the optical fiber waveguide; in these embodiments, the wavelengths not reflected are filtered through the reflective surface. Thereby, depending on which reflective surface is positioned at the terminus of the waveguide, determined by the position of the orientable structure, certain wavelengths will be filtered through the reflective surface and in the present embodiment will pass through the secondary opposing waveguide to the visual indicator. In an exemplary embodiment, the wavelengths transmitted through the secondary opposing waveguide to the visual indicator may be red or green wavelengths, respectively indicating an off and on position of the orientable structure. These visual indicators, such as a clear or opaque window that allows a color or wavelength or a combination of wavelengths received through the switch filter and transmitted through a secondary waveguide to be visibly indicated at or near the switch, are further useful for visually knowing if the switch is receiving an optical signal independent of the actual switch position. Furthermore, these indicators may be useful as a lighted switch system indicating a switch location in a dark area to a user and facilitating the operation of the switch. As these optical switches are non-powered, an led or other form of electrical illumination is not practical nor desired in a remote switch location, the illumination from the passthrough light energy of the optomechanical switch may become a surface location and identifiable switch position indicator.

An embodiment of a system of the disclosed technology is provided in the block diagram schematic of FIG. 54, including a non-powered reflective optomechanical position switch 1, an optocontroller 4 and an illustrative electrically controlled device A indicating the connective relationship of the three components associated with an optocontrolling system, and one embodiment of the basic internal functional elements of an optocontroller. Fiber optic waveguide connectors 2C secure the waveguide 2 to the switch 1 and the optocontroller 4.

In the embodiment shown, the optocontroller 4 comprises an optocontrolling transceiver O which generates light and transmits it through the optical fiber waveguide to one or more non-powered optomechanical position switches, and receives and detects the properties of the manipulated light reflected by the optomechanical switch back through the waveguide. In some embodiments the transceiver comprises a wavelength generator for generating the light signal for transmission through the optical fiber waveguide to the optomechanical switch(es). The wavelength generator may be a differentially selective multi-wavelength generator, such as one or more selective wavelength light emitting diodes or laser emitters to selectively transmit varying wavelengths of light. For example, the wavelength generator may be a white light emitting diode, and/or red, green and blue light emitting diodes; alternatively, the wavelength generator may be one or more wavelength laser emitters, such as laser emitters transmitting red, green and blue wavelengths of light. In these and other embodiments, the transceiver further comprises a plurality of photodetectors, a spectrometer, a camera system, a CCD, or a CMOS device to perceivably detect the properties (e.g., wavelength and/or polarization) of the light reflected back through the optical fiber waveguide, by and based upon the position of the optomechanical switch.

The optocontrolling transceiver comprises or is coupled with a microprocessor M, which is programmed to receive and differentiate the detected light properties from the transceiver, and generate and send signals to a switching controller S based upon the properties of the light signal received by the optocontroller. The switching controller which includes electrical relays that allow an electrical current to flow in a closed state and prevent the passage of current in an open state then controls the electrically controlled device A, through for example an electric control wire C2, based upon the signals so received and processed.

Connectors, such as a self-centering preload connector as hereinabove described, are also shown in this system, coupling the ends of the optical fiber waveguide to the switch and the optocontroller, respectively.

Figure 1:
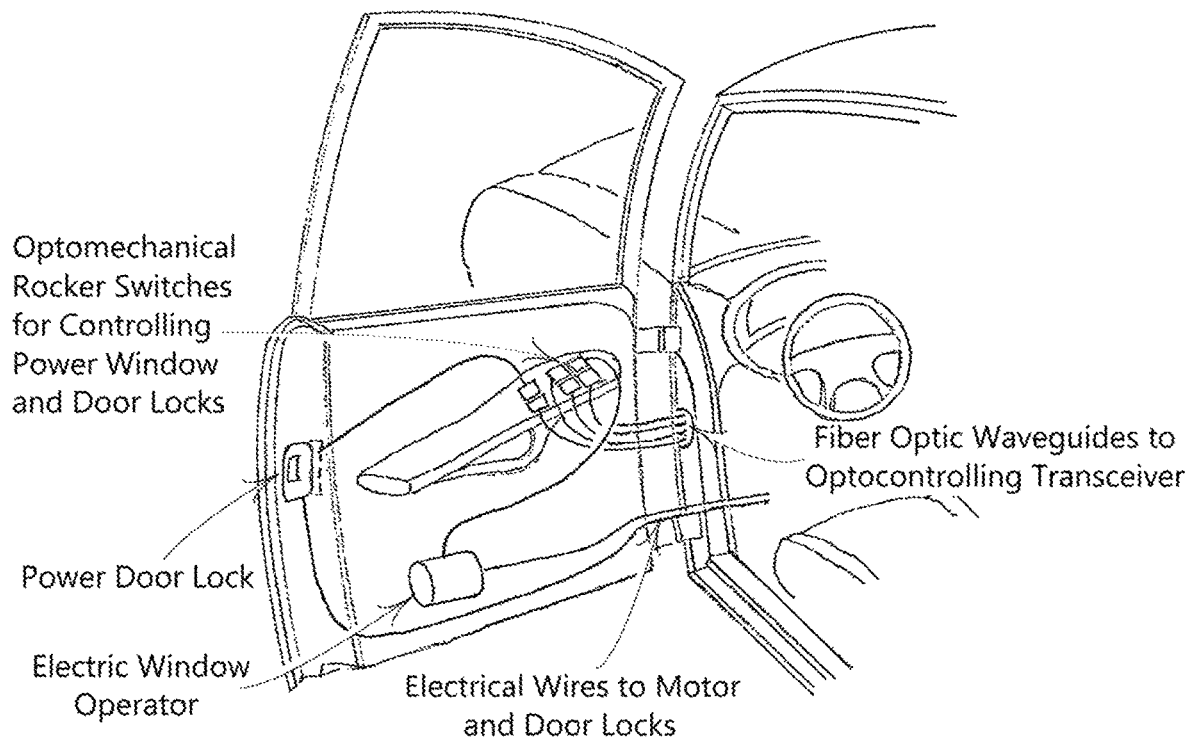
FIG. 1 shows a representation of an embodiment of the disclosed technology to control automobile power windows and door locks, utilizing the optocontrolling transceiver system of the disclosed technology and three-position optomechanical switches in an closed-open-closed configuration.
Figure 2:
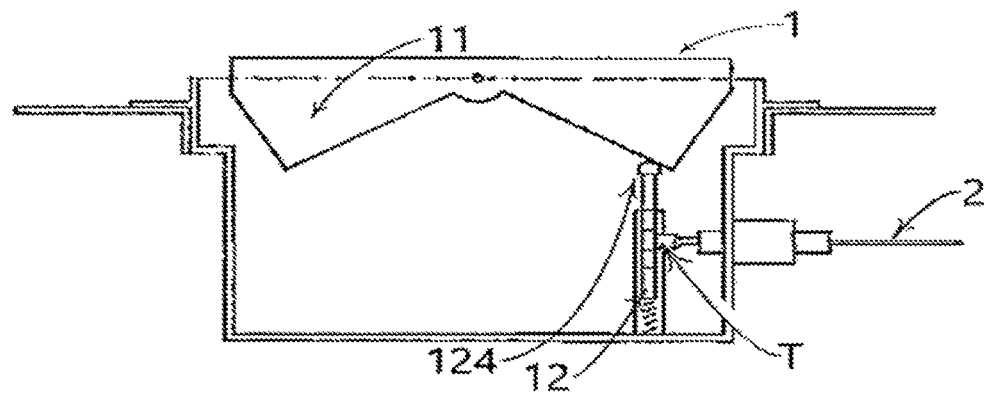
FIG. 2 is a side view of an embodiment of a momentary rocker three-position switch of the disclosed technology, represented in a first position.
Figure 25:
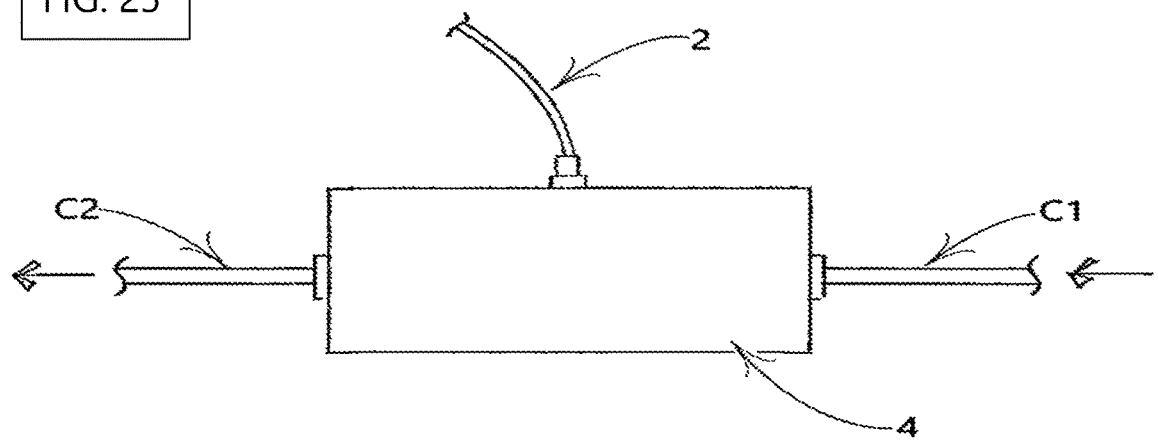
FIG. 25 is a front view of an embodiment of a two-way switch optical fiber waveguide connection configuration of the optocontrolling transceiver of the disclosed technology.
Figure 26:
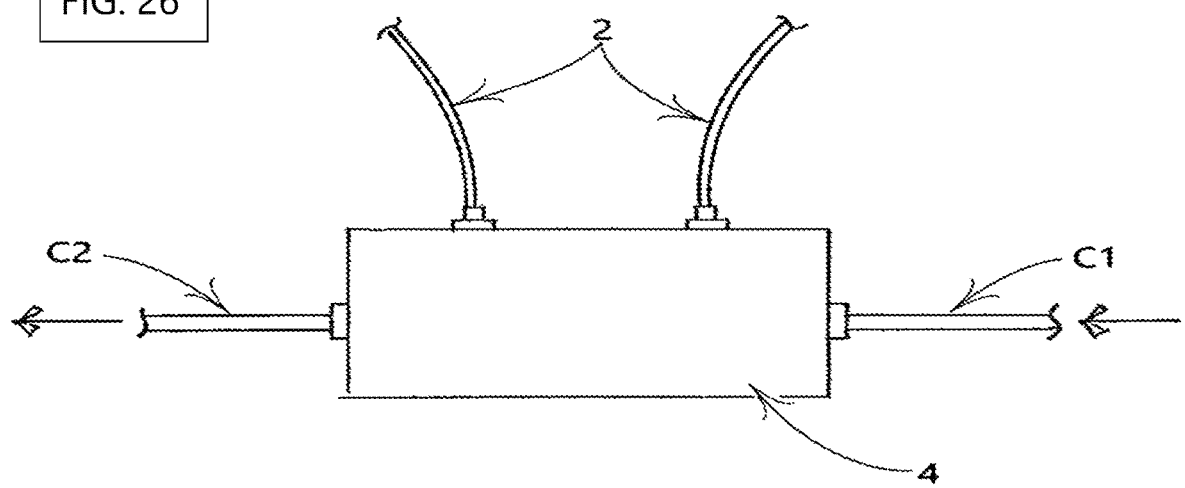
FIG. 26 is a front view of an embodiment of a three-way switch optical fiber waveguide configuration showing two optical fiber waveguide connections of the optocontrolling transceiver of the disclosed technology that may be capable of controlling a device from multiple optomechanical switches and from multiple locations.
Figure 27:
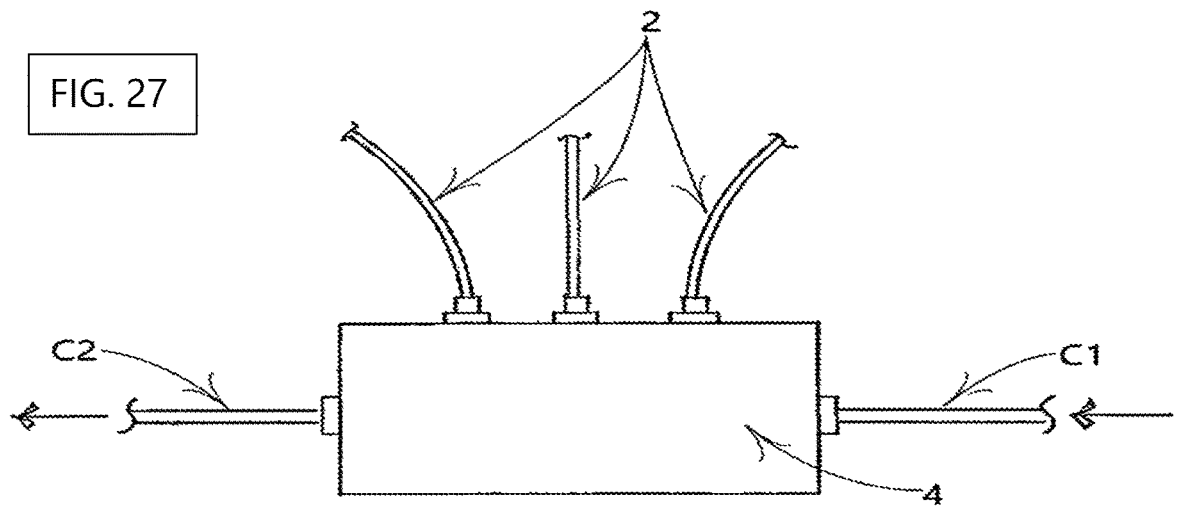
FIG. 27 is a front view of an embodiment of a four-way switch optical fiber wave guide configuration showing three optical fiber waveguide connections of the optocontrolling transceiver of the disclosed technology that may be capable of controlling a device from multiple optomechanical switches and from multiple locations.

In another embodiment, such as shown in FIGS. 1 and 20, and as herein described, two or more individual remote accessory switches (in a three-way or other multi-way switch configuration) of the disclosed technology can operate the same accessory, including for example a light fixture, or automobile door locks and windows. FIGS. 25-27 are representations of an optocontrolling transceiver 4 showing the power supply wires C1 on one side and the control switched supply wires to the electrical appliance C2 on the other side of the transceiver. For example, an optocontroller including a transceiver controlled by a single switch (in a two-way switch configuration, with a single optical fiber waveguide 2) is depicted in FIG. 25; one controlled by two switches (in a three-way switch configuration) is shown in FIG. 26, and one controlled by three switches (in a four-way switch configuration) is shown in FIG. 27. The transceiver 4 is designed and configured to detect the signals received from the waveguide(s), and based upon the properties of the light so received, selectively provides power through the switching controller's electrical relays incorporated within the optocontroller, or may otherwise generate signals C2 to control an appliance.

Referring to the exemplary embodiment of FIG. 1 as hereinabove described using momentary switches, upon receipt of the signal communicating the first close/on state, the transceiver may activate electrical relays to operate an accessory component in one direction, as in a window or door lock in the up position, and upon receiving the signal communicating a second closed/on state, the transceiver may activate relays to operate the accessories in an opposite direction, i.e. the door lock or window would move in the down position.

Figure 21:
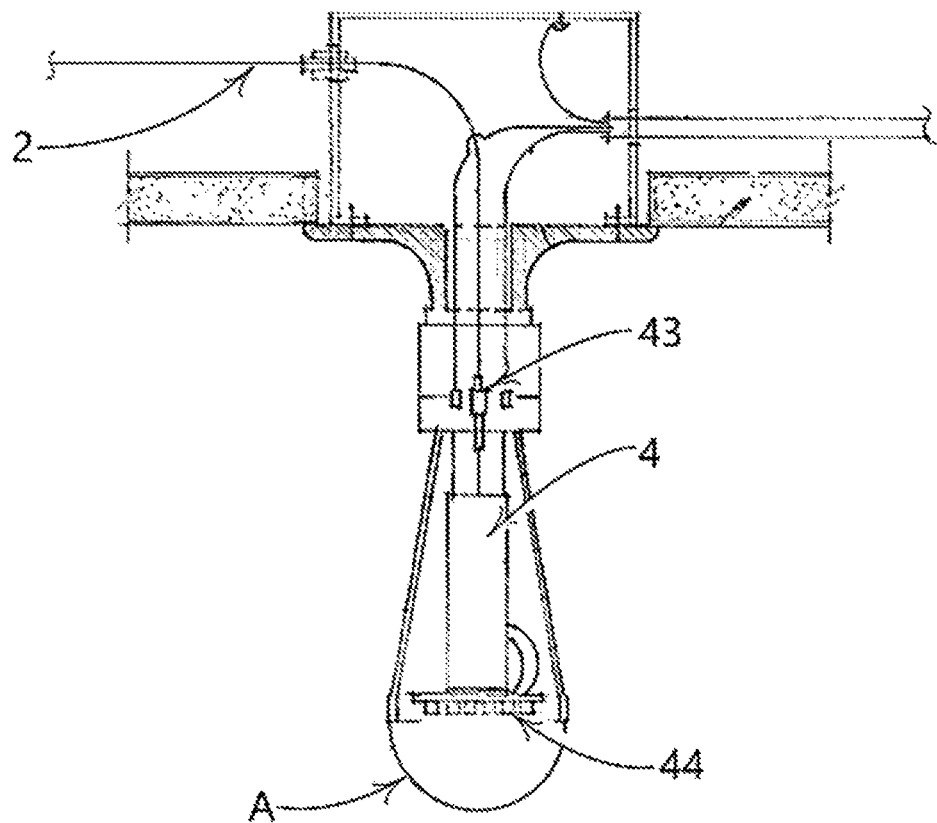
FIG. 21 is a front view of an exemplary lighting fixture, coupled with an embodiment of the optocontrolling transceiver of the disclosed technology.
Figure 22:
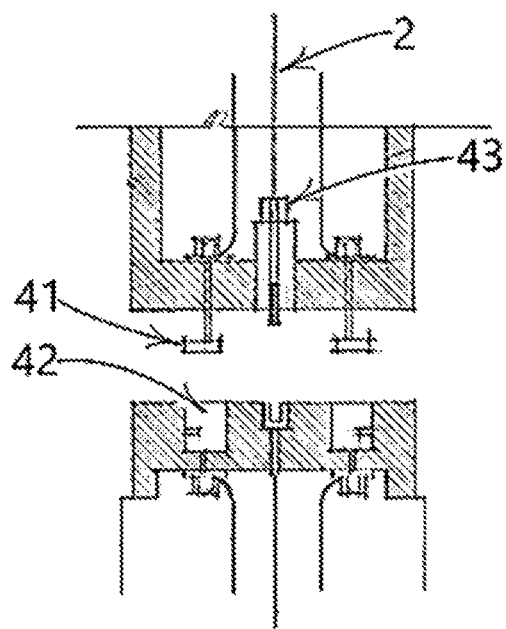
FIG. 22 is a front view of the electrical twist lock connection of the lighting fixture and the lamp base of the embodiment shown in FIG. 21, for making a fiber optic connection and useful in the disclosed technology.

Referring now to the exemplary embodiments of FIGS. 20-24, lighting fixtures A are coupled with an optocontrolling transceiver 4 of the disclosed technology. As shown in FIGS. 21 and 22, an LED bulb is coupled with and controlled by the optocontrolling transceiver. In this embodiment, the bulb is removably affixed to couple with the transceiver by means of an electrical twist lock connection 41, 42 with an integral spring loaded, centrally located optical fiber quick connector 43 for making the fiber optic connection from the optomechanical switch to the optocontrolling transceiver positioned within the bulb. The twist lock electrical connector base 42 and the self-centering preload connector optical fiber quick connector 43 are shown in closer detail in FIG. 22. A variation such as a screw base or bolted attachment including the self-centering preload connector can also be utilized on a fixture including an optomechanical switch of the disclosed technology, providing an accelerated connect/disconnect option.

Figure 23:
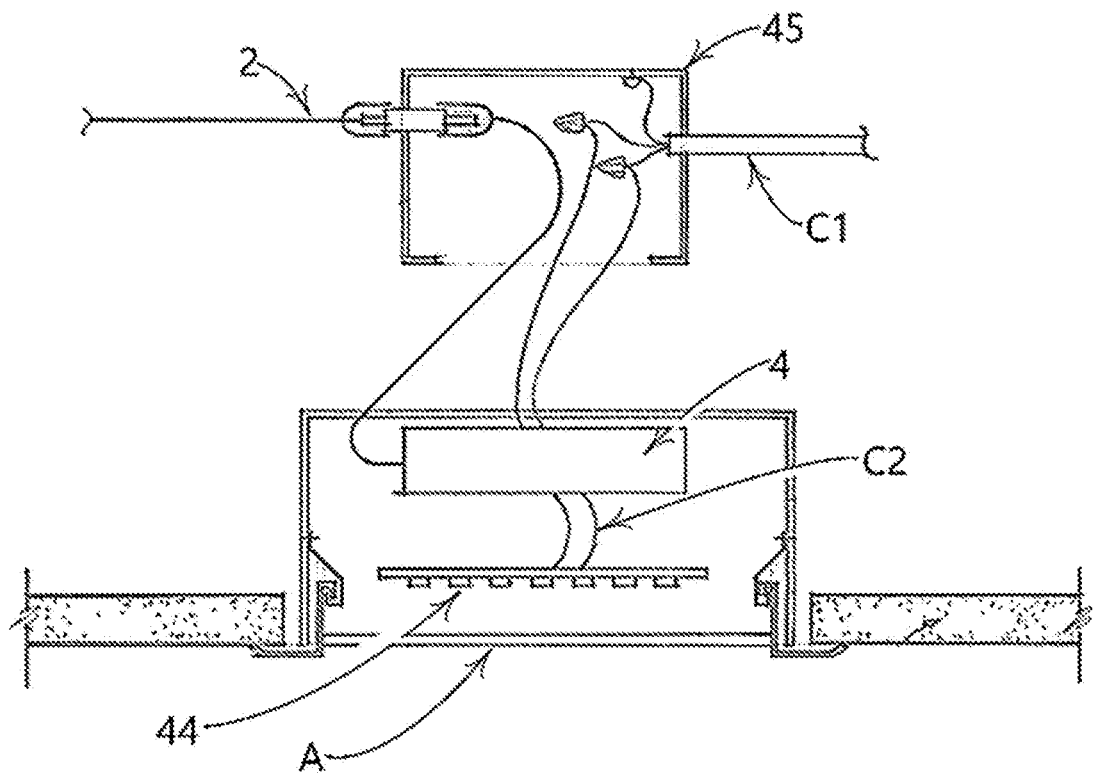
FIG. 23 is a front view of an exemplary recessed LED type lighting panel, coupled with an embodiment of the system of the disclosed technology.
Figure 24:
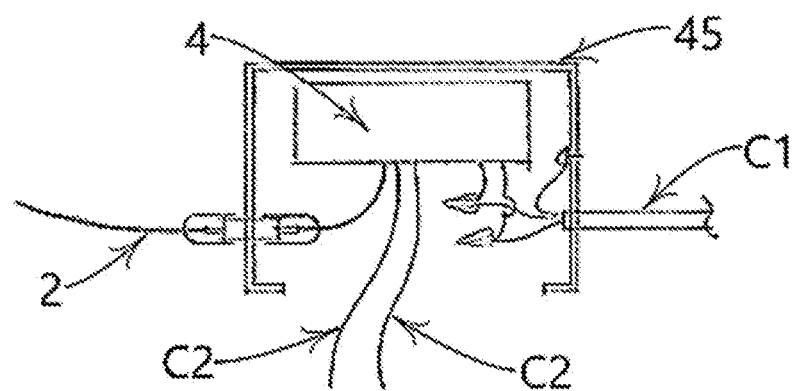
FIG. 24 is a front view of an exemplary electrical junction box with an integrally housed embodiment of an optocontrolling transceiver of the disclosed technology.

In another embodiment, as depicted in FIG. 23, a recessed optocontroller equipped lighting appliance is provided, including an LED type lighting panel 44 controlled through the remotely connected optomechanical position switch and powered through a standard electrical junction box 45. In the embodiment shown in FIG. 24 an electrical junction box 45 and integrally housed and electrically powered optocontrolling transceiver 4 and fiber optically connected to a remote optomechanical position switch of the disclosed technology by means of an optical fiber waveguide 2 for control switching of connected electrical appliances A.

Even in sealed switch housing, particulates from wear surfaces within the switch may from time to time accumulate on the reflective surfaces and cause optical obstructions; similarly, atmospheric conditions may result in moisture precipitate to settle on the reflective surfaces, thereby manipulating the wavelength, polarity or intensity of the signal reflected by the switch. These and similar conditions could potentially result in a false reading by a detector. Therefore, in order to maintain the reflective surfaces free from particulate and moisture contamination, a soft waveguide attachment 21 as shown in the drawings, including FIGS. 35-37 and 40-42 is secured at the terminus of the waveguides, and provides for a boot type fitting (such as a silicone shroud or a synthetic bristle brush).

As shown in FIG. 1, and hereinabove discussed, embodiments of the disclosed technology can be incorporated into an automobile. For example, the driver door power window and power door lock switches may be designed as three-position optomechanical switches of the disclosed technology, with optocontrolling transceivers coupled with power motors for the windows and doors of the vehicle, and optical fiber waveguides transmitting the position of the switches to the respective optocontrolling transceiver. Additionally, one or more additional three-position optomechanical switches can be linked with each optocontrolling transceiver to control the door lock or window from a passenger side or other location within the vehicle, thereby allowing a power window or door lock to be controlled by both the driver's side control switches and alternately the passenger side three-position switches, in a three-way configuration. Thereby, utilizing the switches and systems of the disclosed technology as herein described, the electric control switch wiring of the prior art can be replaced with optical fiber waveguides and optomechanical position switches of the disclosed technology.

In another practical embodiment, the optomechanical switch 1 and system of the disclosed technology may be used as a safety lockout position switch for manufacturing equipment 10, as shown in FIGS. 52 and 53. In the embodiment shown, the system of the disclosed technology may prevent commencement of machining operations prior to closure of safety containment devices such as a gate or door 111 or other lockable structure, or to verify operator clearance from moving parts, thereby precluding accidental starts through the continuity of light signal system of the disclosed technology and precluding any false start due to a damaged optical fiber waveguide 2 or optomechanical switch malfunction resulting in a loss of light signal and subsequent indicated switch position of the disclosed technology. As shown in FIG. 53, a reciprocating three position optomechanical switch 1 may be used in such a system, wherein the switch position is in physical communication with and controlled by the position of the gate. Thereby, the disclosed technology enables the optomechanical switch on a safety gate to indicate a full open, full shut or in motion condition. In this embodiment, the switch is likely spring-loaded, to achieve a position when the gate is not in physical communication with the switch. In this embodiment, a plurality of wavelengths or bifurcated polarized signal reflectively communicates the gate and corresponding switch positions by a continuity of manipulated reflected transmissions to the optocontroller 4; the optocontroller, having received the light from the switch communicating the gate and corresponding switch positions then may control operation of the manufacturing equipment, ensuring that operation does not occur while the gate is in a position that could harm the operator thereof. While this is an exemplary embodiment, optomechanical switches of the disclosed technology may be in physical proximity to moving components of manufacturing or other equipment, wherein the position of the moving components directly affect the position of the optomechanical switch, to continuously communicate safe (or unsafe) conditions to an optocontroller, and thereby cease operation of equipment for so long as the unsafe condition exists.

All of the representations and examples of these switch types provide a continuity of signal in all switch positions and do not allow an absence of optical signal to indicate a single switch position as is prevalent in current optomechanical switch designs. These devices and methods of multiplexed wavelength detection support continuity between the non-powered optomechanical switches and the accompanying optocontrolling transceiver. Accordingly, mission critical systems utilizing a plurality of transmitted wavelengths may provide an implied ohm test or always-on optical self-test of an optical fiber waveguide and switch by the optocontroller. Subsequently, the fiber connected and remotely positioned optocontroller may include warning indicators to represent an absence of all reflected wavelengths as a fault in the optic circuit. The same or another controller could also convey or display visual and or audible indicators of an optomechanical switch position. Additionally, these optocontrolling systems may provide operational control of electrical lighting and appliance hardware, directional and positional awareness for autonomous systems and operable components and fail-safe industrial interlocking functions for safety and security applications.

Although elements of the disclosed technology may be herein described in association with one or more embodiments, it is recognized that to the extent the elements can be applied to other embodiments, the same are believed to be within the scope of the claims as hereinafter provided.

The invention claimed is:

1. A non-powered, optomechanical position switch for controlling an apparatus by receiving and reflecting a continuity of light signal through an optical fiber waveguide, wherein in reflecting the light the switch, in at least some positions, manipulates one or more properties of the received light based upon the position of the switch, and the light so reflected traverses back through the optical fiber waveguide to the apparatus, the optomechanical switch comprising:
  a non-powered, mechanical element, movable between at least two switch positions, the mechanical element being coupled with an orientable structure supporting a plurality of reflective surfaces, wherein by means of selective wavelength reflection, bandpass filtering, dichroic filtering, or polarization by reflection, or a combination thereof, at least some of the reflective surfaces uniquely manipulates one or more properties of light received from an optical fiber waveguide in reflecting the light back through the optical fiber waveguide to the apparatus, and wherein the switch position of the mechanical element determines the orientation of the orientable structure; and
  wherein the orientable structure is positioned near the terminus of the optical fiber waveguide such that, based upon an orientation of the orientable structure relative to the terminus of the optical fiber, one of the plurality of reflective surfaces is positioned at the terminus of the optical fiber waveguide, and
  wherein movement of the mechanical element among the switch positions translates movement to the orientable structure, thereby mechanically controlling which of the plurality of reflective surfaces is positioned at the terminus of the optical fiber waveguide and which if any properties of light are manipulated and reflected back through the optical fiber waveguide to the apparatus.

2. The non-powered, optomechanical position switch of claim 1, wherein the properties of light manipulated by the plurality of reflective surfaces are wavelengths, polarizations, or combinations thereof.

3. The non-powered, optomechanical position switch of claim 1, wherein the reflected surfaces do not modulate the light in reflecting the same back through the optical fiber waveguide to the apparatus.

4. The non-powered, optomechanical position switch of claim 1, wherein each of the reflective surfaces comprises a bandpass reflective filter or a dichroic reflective filter, the filter having a unique wavelength selectivity.

5. The non-powered, optomechanical position switch of claim 1, wherein one of the reflective surfaces which when positioned at the terminus of the optical fiber waveguide reflects back light received from the optical fiber waveguide without manipulating any properties of the light received.

6. The non-powered, optomechanical position switch of claim 1, further comprising a second optical fiber waveguide coupled with the orientable structure, wherein at least some of the plurality of reflected surfaces further selectively allow one or more unique wavelengths of light to pass through the reflected surface to and through the second optical fiber waveguide to a visual indicator, thereby visually indicating the switch position.

7. The non-powered, optomechanical position switch of claim 1, wherein the orientable structure comprises a pivoting carriage frame assembly comprising an arced member supporting the plurality of reflective surfaces, the carriage frame assembly being coupled with the mechanical element by means of a linking element, wherein movement of the mechanical element between positions translates into movement of the linking element, which translates into pivoting of the carriage frame assembly.

8. The non-powered, optomechanical position switch of claim 1, wherein the orientable structure is a spring-loaded carriage assembly supporting the plurality of reflective surfaces.

9. The non-powered, optomechanical position switch of claim 8, wherein the spring-loaded carriage assembly comprises a carriage supporting a plurality of reflective surfaces, the carriage comprising a pair of posts, a pair of cross bars, and a control post to control orientation of the carriage, wherein the posts of the carriage are housed within a pair of guide cylinders facilitating and controlling movement and orientation of the carriage and housing the posts, the guide cylinders comprising a spring to further facilitate movement and orientation of the carriage.

10. The non-powered, optomechanical position switch of claim 1, wherein the orientable structure is a cylindrical support structure, and the plurality of reflected surfaces supported thereby gradually increment in reflected wavelengths or polarizations or a combination thereof along its surface.

11. The non-powered, optomechanical position switch of claim 1, wherein the reflected surfaces are affixed to the orientable structure, and do not move or oscillate independent of such structure.

12. An operational control system for controlling an apparatus, the control system comprising:
   a first optical fiber waveguide having a terminus;
   a first non-powered optomechanical position switch comprising an orientable structure supporting a plurality of reflective surfaces at the terminus of the first waveguide, wherein by means of selective wavelength reflection, bandpass filtering, dichroic filtering, or polarization by reflection, or a combination thereof, at least some of the reflective surfaces each uniquely manipulates one or more properties of light received from the first waveguide in reflecting light back through the first waveguide to the apparatus, and wherein orienting the orientable structure of the first switch relative to the terminus of the first waveguide determines which of the plurality of reflective surfaces is positioned at the terminus of the first waveguide; and
   an optocontrolling transceiver designed for coupling with the apparatus, the optocontrolling transceiver generating and receiving light to and from the first waveguide, detecting the properties of the light received, and controlling an operational state of the apparatus based upon the properties of the light received.

13. The operational control system of claim 12, further comprising a mechanical element, movable between at least two switch positions, the mechanical element being coupled with the orientable structure, wherein movement of the mechanical element between the positions translates movement to the orientable structure to orient the same and the plurality of reflective surfaces relative to the terminus of the optical fiber waveguide.

14. The operational control system of claim 12, further comprising:
   a second optical fiber waveguide having a terminus; and
   a second non-powered optomechanical position switch comprising another orientable structure supporting another plurality of reflective surfaces at the terminus of the second optical fiber waveguide, wherein at least some of the reflective surfaces of the orientable structure of the second switch each uniquely manipulates one or more properties of light received from the second waveguide in reflecting light back through the second waveguide to the apparatus, and wherein orienting the orientable structure of the second switch relative to the terminus of the second waveguide determines which of the plurality of reflective surfaces of the second switch is positioned at the terminus of the second waveguide; and
wherein the optocontrolling transceiver further generates and receives light to and from the second waveguide, detecting the properties of the light received from the second waveguide, and controlling an operational state of the apparatus based upon the properties of the light received from the first waveguide and the second waveguide.

15. The operational control system of claim 12, wherein the reflected surfaces do not modulate the light in reflecting the same back through the optical fiber waveguide to the apparatus.

16. The operational control system of claim 12, wherein the reflected surfaces are affixed to the orientable structure, and do not move or oscillate independent of such structure.

* * * * *